Sept. 21, 1965    D. S. GROSS    3,207,430
SPLIT MULTIPLICATION MECHANISM FOR CALCULATING MACHINE
Filed April 5, 1962    13 Sheets-Sheet 8
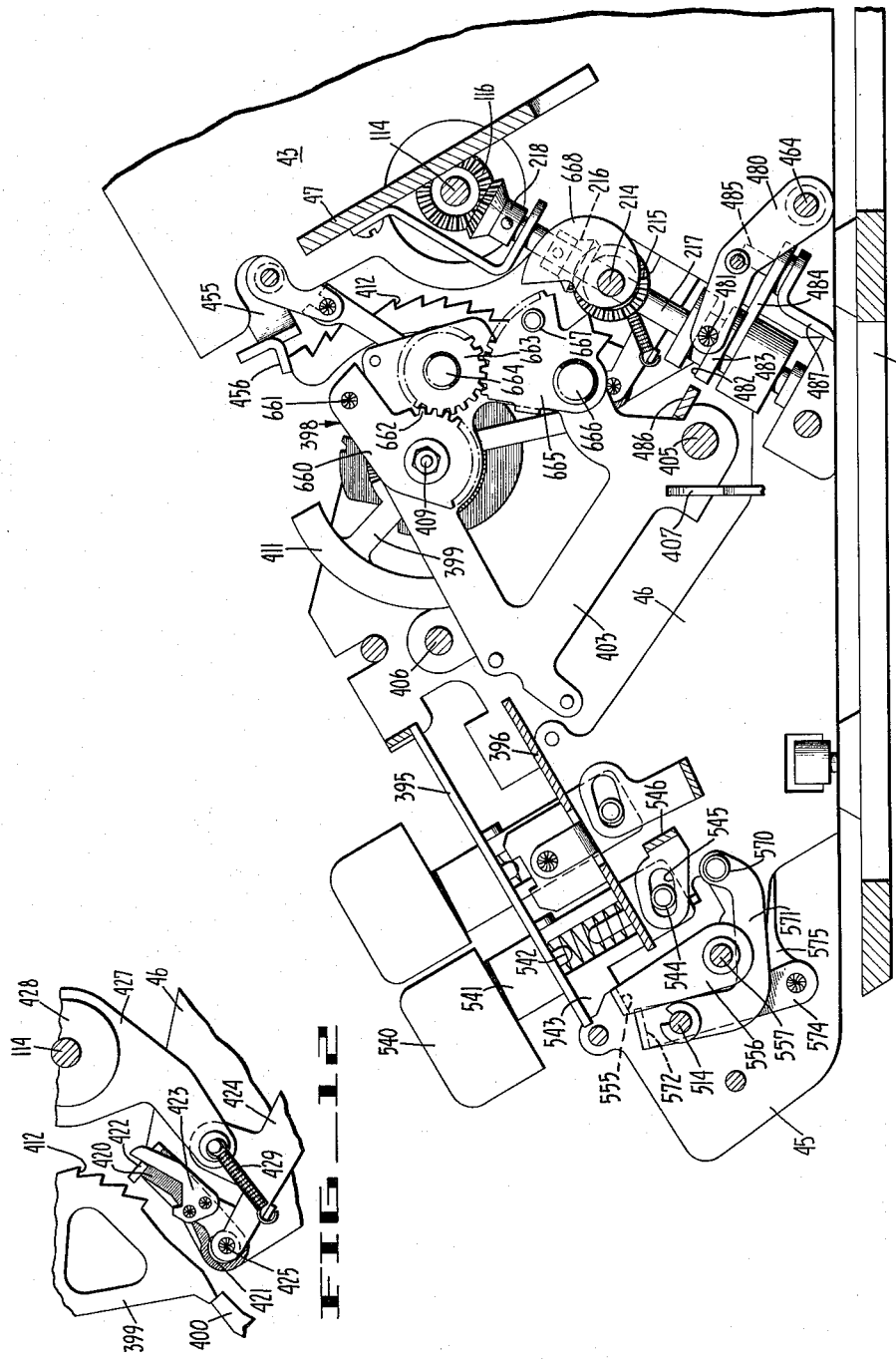

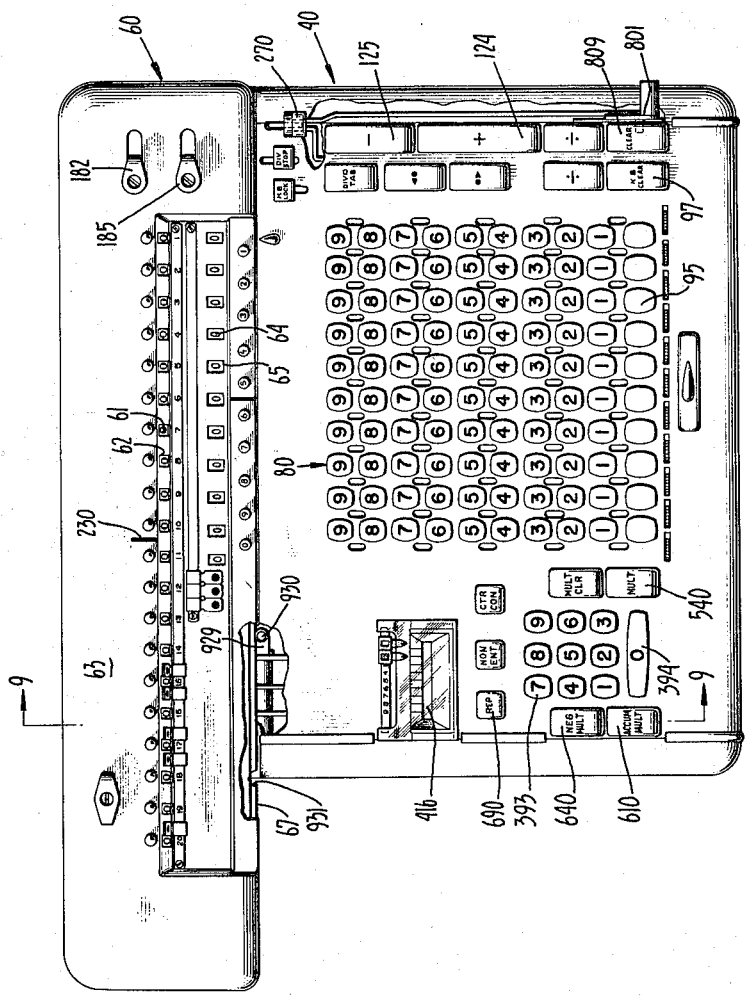

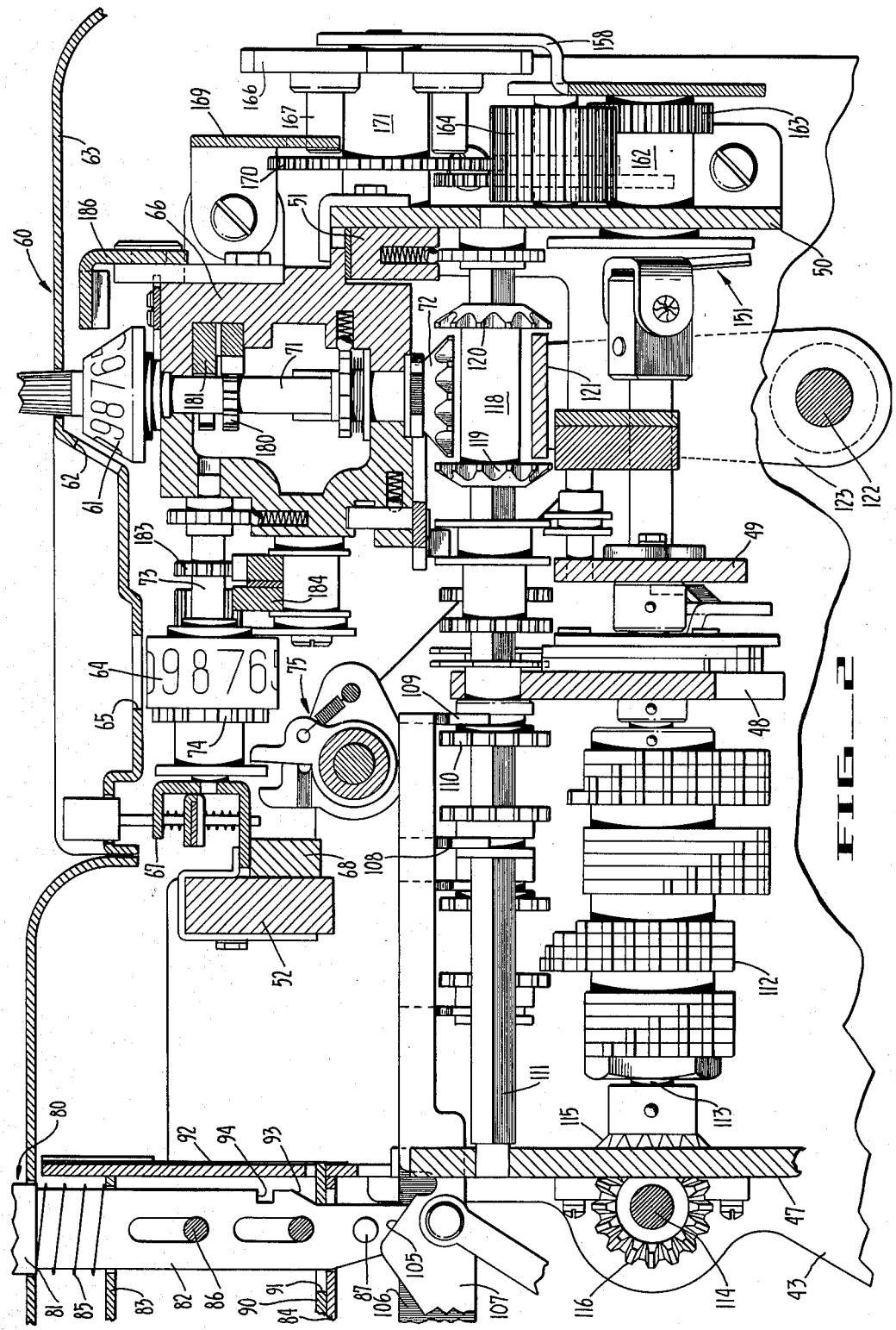

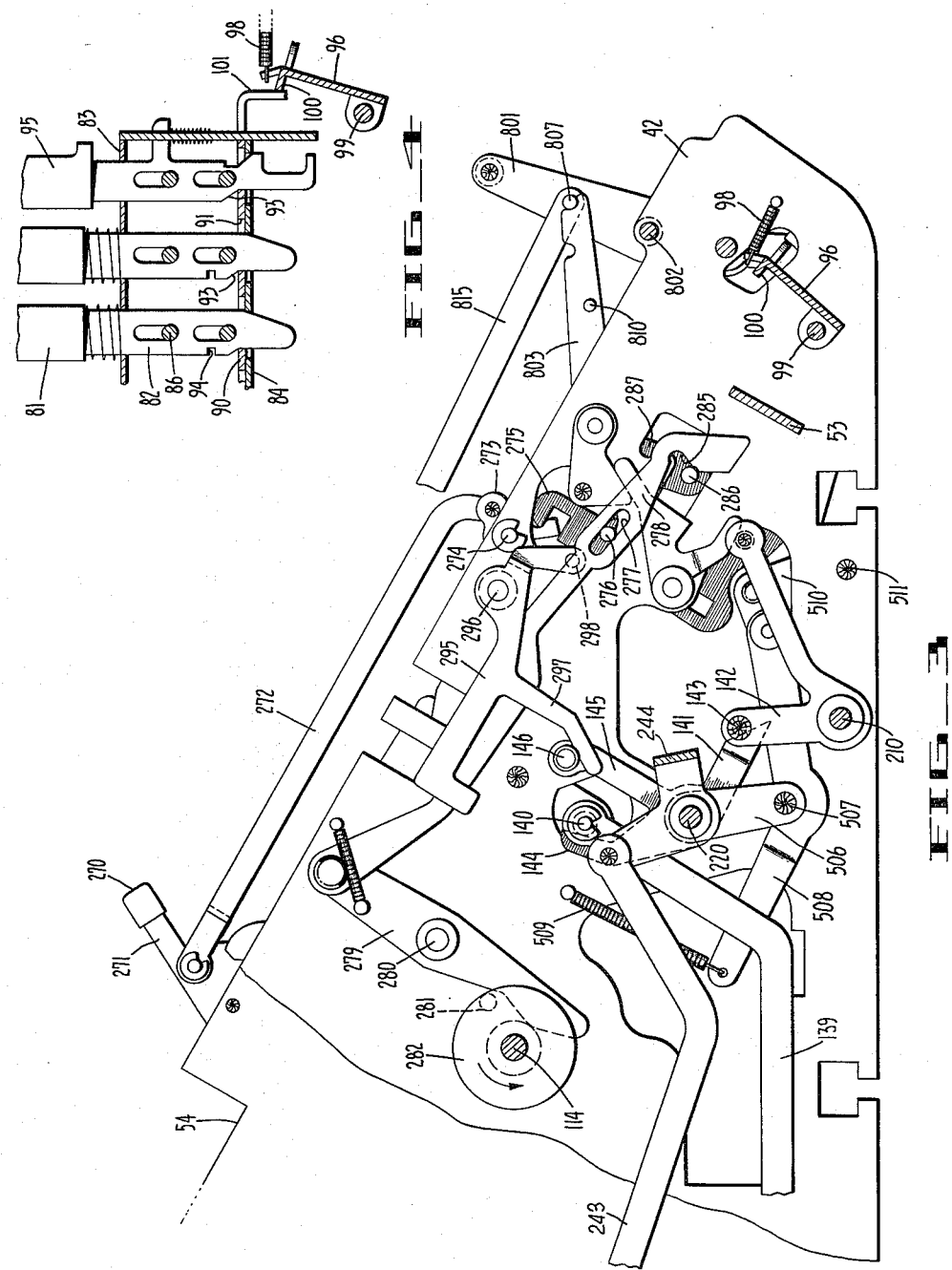

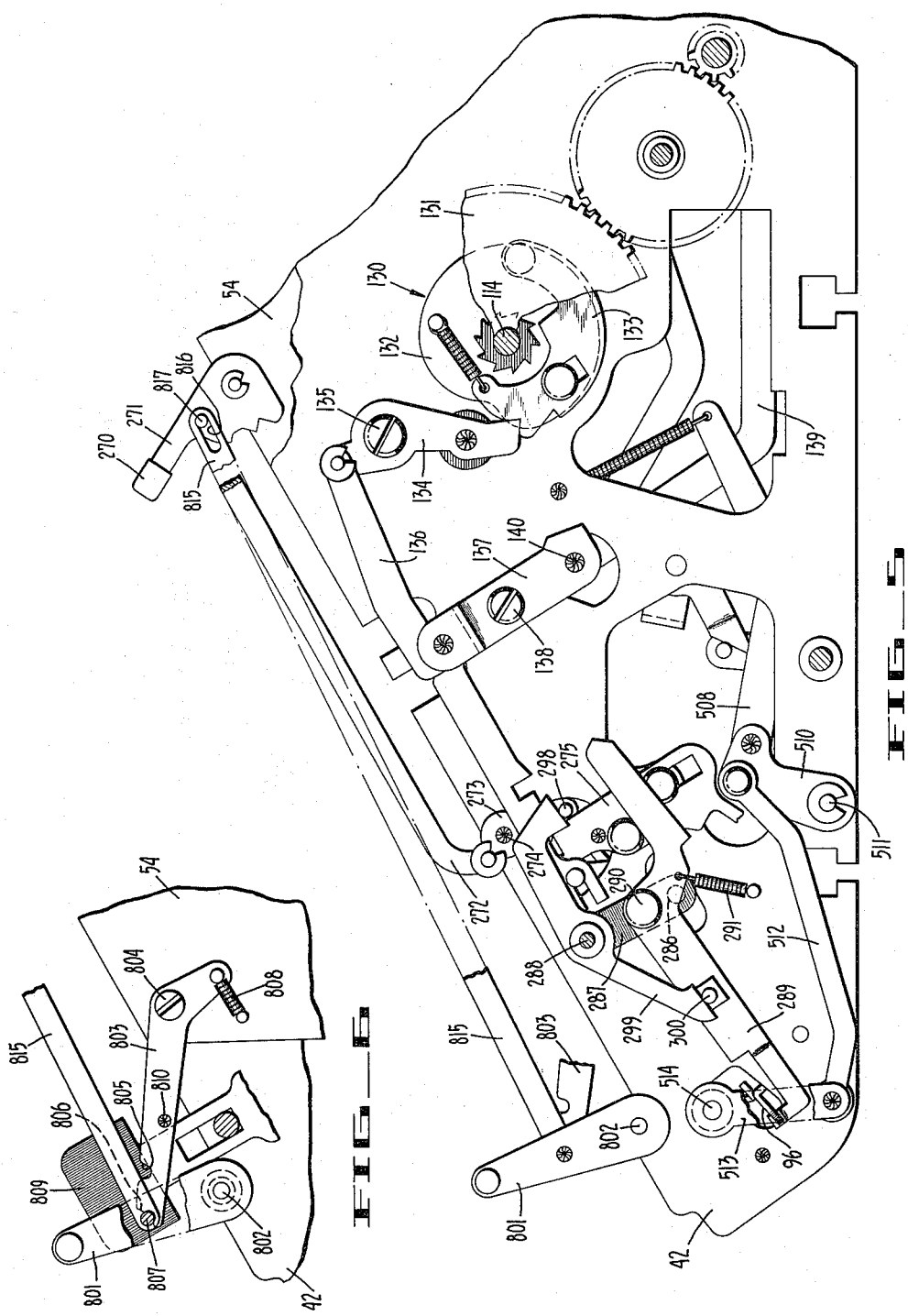

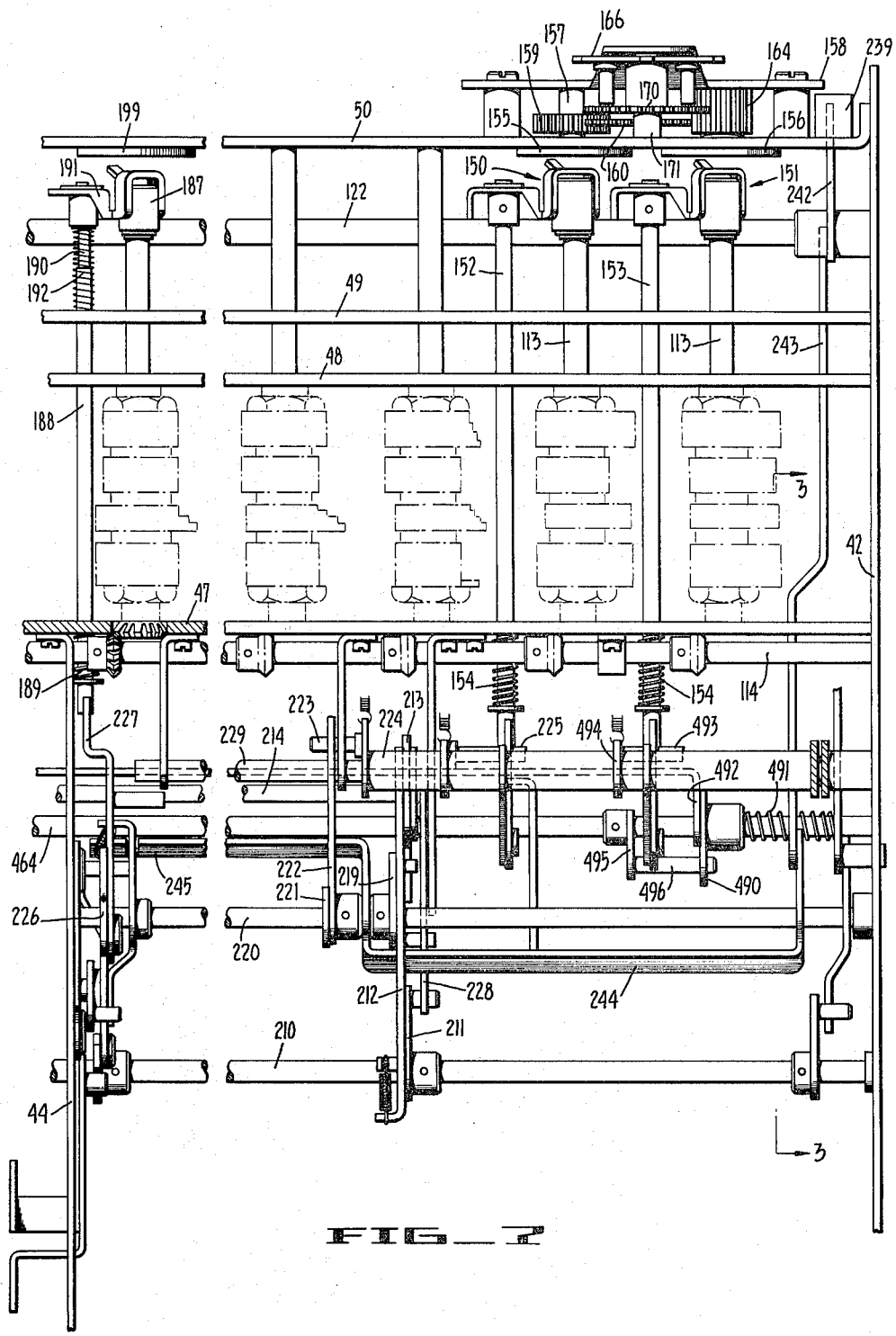
FIG_7

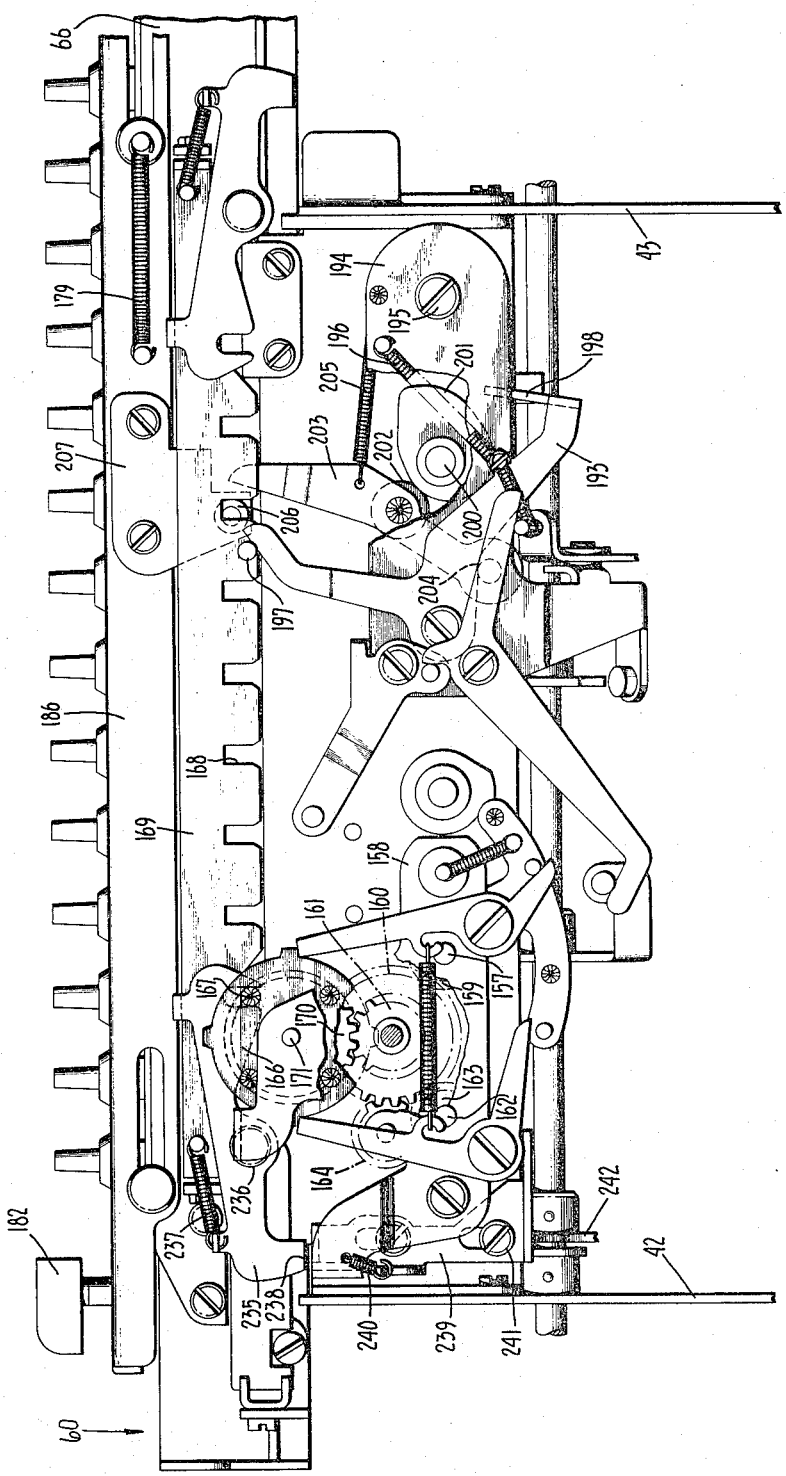

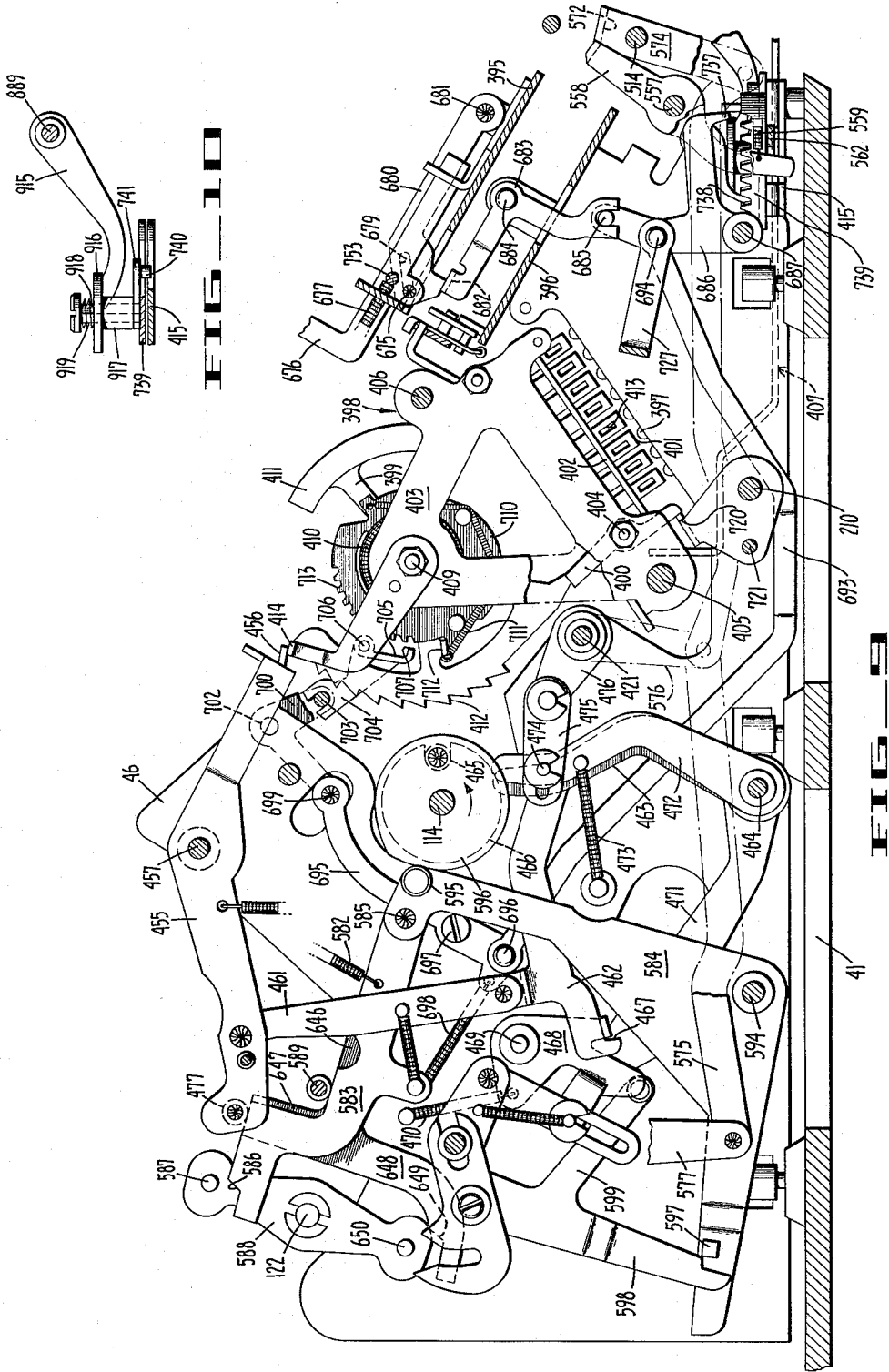

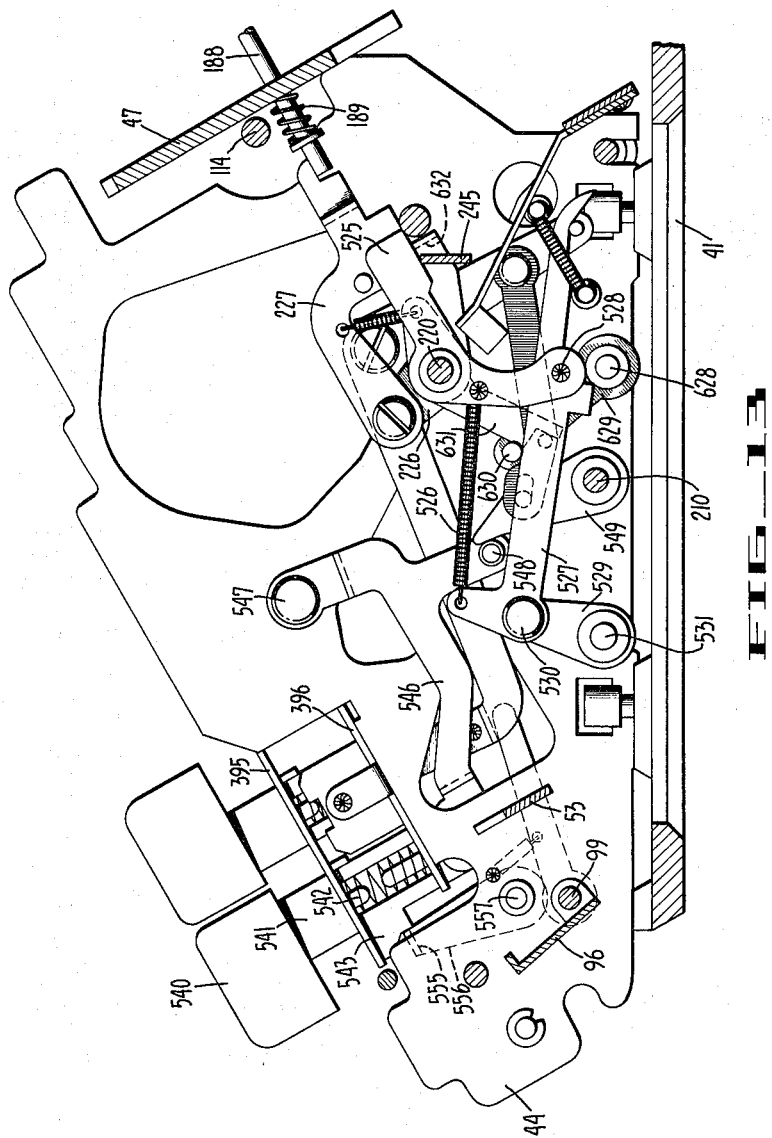

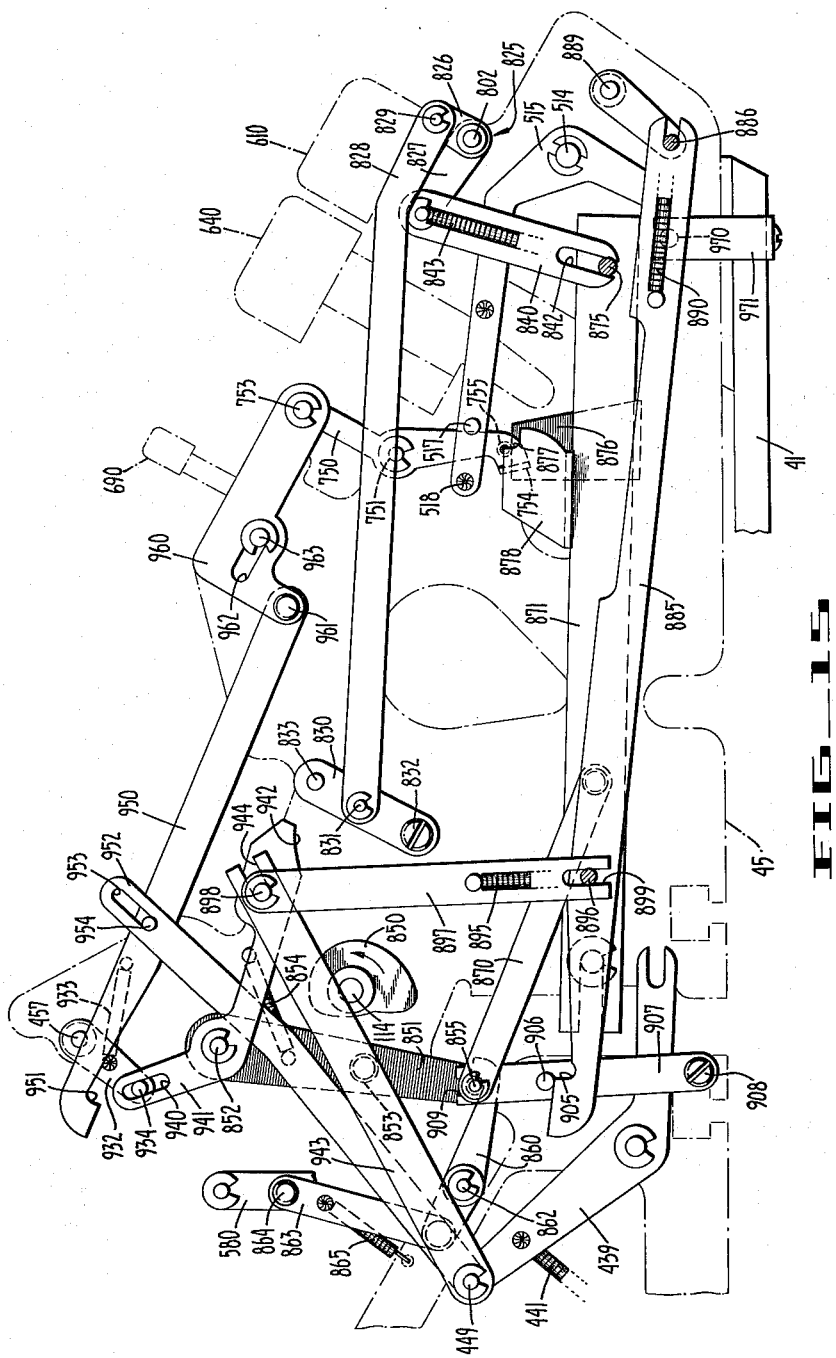

Sept. 21, 1965  D. S. GROSS  3,207,430
SPLIT MULTIPLICATION MECHANISM FOR CALCULATING MACHINE
Filed April 5, 1962  13 Sheets-Sheet 12
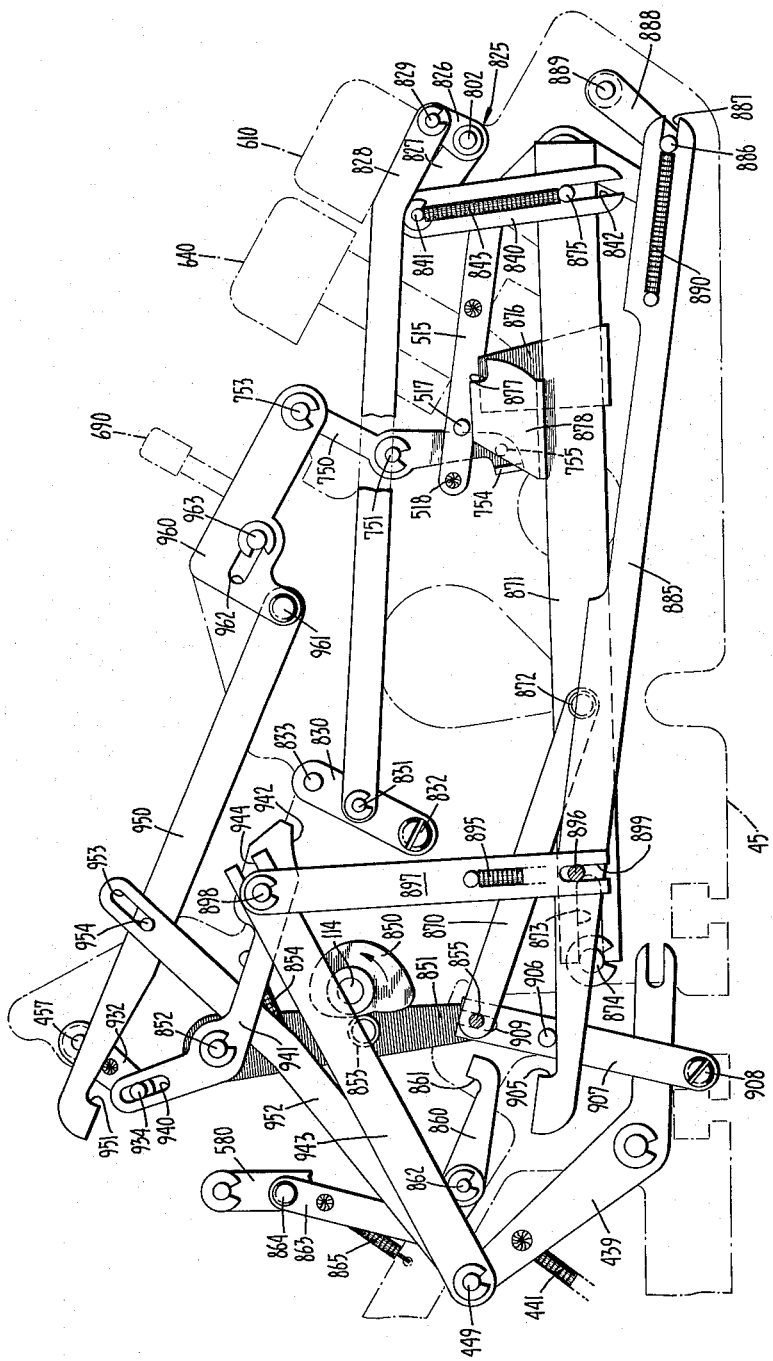
FIG_16

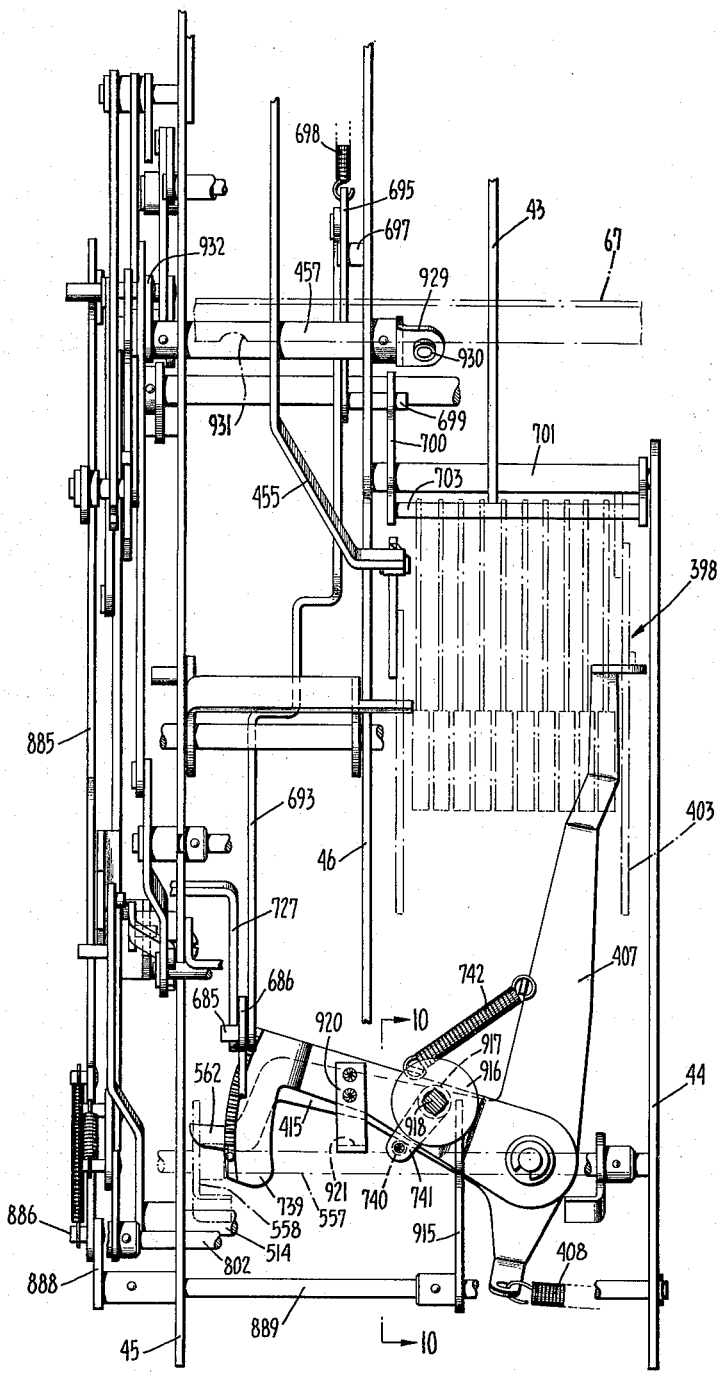
FIG_12

United States Patent Office 3,207,430
Patented Sept. 21, 1965

3,207,430
SPLIT MULTIPLICATION MECHANISM FOR CALCULATING MACHINE
Dunstan S. Gross, Oakland, Calif., assignor, by mesne assignments, to Friden, Inc., San Leandro, Calif., a corporation of Delaware
Filed Apr. 5, 1962, Ser. No. 185,297
14 Claims. (Cl. 235—63)

This invention relates to calculating machines, and particularly to such a machine of increased capacity for performing what might be called "semiautomatic split-multiplication" work.

Another object of the invention is to provide an improved multiplying mechanism for a calculating machine.

Another object of the invention is to provide a selectively operable split-multiplier mechanism for manual operation.

It is a further object of the present invention to provide a mechanism whereby the capacity of the conventional calculating machine can be increased for split-multiplication work. In the preferred form of my invention I am enabled to multiply two five-digit multiplicand factors by a five-digit multiplier factor and still keep the two products separate on two sides of the customary twenty-order register.

Most of the calculating machines on the market at the present time have a maximum capacity of ten orders for a multiplicand factor, ten orders for the multiplier factor and a register of twenty or twenty-one orders. This enables an operator to multiply one ten-digit factor by another ten-digit factor, and, in most cases, this is sufficient for straight multiplication work. However, there are a number of problems in which it is desired to multiply two smaller factors by a single value. One example of such a situation is in inventory work, for it is often desired to simultaneously compute the purchase price and the selling price, and to keep these two values in parallel columns. Suppose that in such a problem the cost of the item was $3.56 and it sold for $9.98 and there were 587 items in stock. In this case the $3.56 is put in the three right-hand orders of the machine to represent cost and the $9.98 is placed in the extreme left-hand orders to represent selling price, and both factors are multiplied by the factor of "587." This gives two separate answers: In the first to sixth orders we have the total cost of $2,089.72 and in the eighth to thirteenth orders we have the value for sales purposes of $5,858.26. These two values are separated by a single "0" in the seventh order, which often is covered by a shutter or decimal marker to keep the two factors separate. It is obvious that in such a problem it is only possible to keep the two values separate when all of the factors are limited to three digits each. If more digits than that are involved in any factor, it is necessary to perform each operation singly, which takes approximately twice the time.

Another illustration of split-multiplication work is in invoicing in which it is desired to simultaneously secure both the product of an item (price, multiplied by quantity) as a single value and simultaneously to accumulate that value with others for a total price. For example, again assuming a price of $9.98 and a quantity of "587," the two factors of $9.98 are put in the three right-hand orders of the keyboard and also in the three left-hand orders, and both are multiplied by "587." This operation gives the total price of $5,858.26 in the first to sixth orders and also in the eighth to thirteenth. Then by a "split-clear" operation in which the six or seven right-hand orders of the register are cleared, but not those to the left thereof, the right side of the register is available for securing a new item price. Thereafter a new product can be secured which stands alone in the right-hand orders, and which is added to the values previously in the left-hand orders. Again this type of work has been limited to three digits multiplied by three digits.

Perhaps it should be mentioned at the outset that the mechanism of the present invention is primarily designed for incorporation in the well-known Friden calculating machine—for my invention, in its preferred embodiment, will be incorporated in such a machine. However, it will be obvious that the invention could be incorporated in, or applied to, any of the commercial machines available on the market. It is well-known among those acquainted with calculating machines that the Friden calculator has a main keyboard of ten orders in which a multiplicand factor can be set, a ten-key multiplier keyboard in which any ten-digit multiplier factor can be set, and a twenty-order accumulator, or product register. In such a machine I provide means selectively operable to condition it for multiplication in the same manner as heretofore, or, alternatively, to provide for "split-multiplication" in which two five-digit multiplicand factors are separately set in the two sides of the main keyboard and a five-digit multiplier factor is set in the multiplier keyboard, and the two products (up to a maximum of ten digits each) will be separately shown in the twenty-order register. In my invention (after first conditioning the machine for split-multiplication) I set the first multiplicand factor in the right-hand side of the main keyboard, the multiplier factor in the multiplier unit, and depress a multiplier control key—which results in the accumulation of a product of not more than ten orders in the right-hand side of the twenty-order register. Then I place the second multiplicand factor in the left-hand side of the keyboard, and again depress a control key, and this second multiplication operation will place the resultant product in the left-hand ten orders of the twenty-order register. By this procedure the two products are not intermingled and stand as two separate products. This result is readily secured by a simple mechanism which, when conditioned for operation, provides means for setting the customary repeat-multiplication mechanism to its operative position prior to the actual initiation of multiplication, and modifying the operation of that mechanism to provide that in the second phase of operation the multiplier carriage is escaped an additional five orders to the left. Coupled with this is a mechanism which, in the second phase of operation, blocks the clearing of the register so that the first product is not erased.

In this respect my invention is similar to that shown and described in the patent of Grant C. Ellerbeck, No. 3,110,441 issued November 12, 1963, which discloses a completely automatic machine. My invention relates to what might be called a "semiautomatic split-multiplication mechanism" which is inexpensive and readily installed in the Friden multiplying calculator. Hence it would be a desirable mechanism to incorporate in the Friden machine for use in those instances when the fully automatic machine, described in the Ellerbeck patent, does not warrant the additional expense required.

It is immaterial in my invention whether the factors on the right and left sides of the keyboard are identical or are different, so that the mechanism of this invention can be used either for the accumulation of totals, as in invoicing (in which case the register is split between the tenth and eleventh orders rather than at the seventh, as in former practice), or for figuring two distinct products as in inventory work above-mentioned.

It can be noted at this point that the split-multiplication of the present invention enables (in the conventional machine) the accumulation of two ten-digit products, each the result of the multiplication of a five-digit multiplicant by a five-digit multiplier and that the two products are kept separate and distinct. This permits a hundredfold increase in the size of the multiplicand and the multiplier in split-multiplying work with a consequent ten-thousandfold increase in the products which may be registered thereby.

These and other objects of the invention will be apparent from the following specification and claims, which will be more easily understood by a consideration of the drawings in which:

FIG. 1 is a plan view of the preferred machine of my invention.

FIG. 2 is a partial cross-sectional view showing particularly the selection, actuating, and registering mechanisms of the machine shown in FIG. 1.

FIG. 3 is a left side view of certain initiating and control mechanisms mounted on the left face of the right side frame plate, taken on a plane indicated by the line 3—3 of FIG. 7.

FIG. 4 is a detail showing the keyboard clearing mechanism.

FIG. 5 is a right side view of the right face of the right-hand frame plate, and in a sense is the reverse side of the mechanism shown in FIG. 3, and shows particularly the clutch and clutch control mechanism and part of what is commonly known as an "add" key mechanism which is operative to clear the keyboard at the end of a cycle of operation.

FIG. 6 is a detail of the latch, or interlock, controlling the operation of the conditioning key for the mechanism of my invention.

FIG. 7 is a cross-sectional plan view of the preferred machine, the view being taken on a plane parallel to, and below, the keyboard.

FIG. 8 is a rear view of the machine shown in these figures, showing particularly the carriage shifting and register clearing mechanisms.

FIG. 9 is a left side view taken through the multiplier mechanism at approximately the plane indicated by the line 9—9 of FIG. 1, showing a major portion of the multiplying mechanism of the preferred machine.

FIG. 10 is a left side view showing in detail the mechanism for adjusting the ordinal position of the multiplier carriage in a repeat operation, taken on the plane indicated by the line 10—10 as shown in FIG. 17.

FIG. 11 is a right side view of the multiplier restoring mechanism, and some of the mechanisms associated with the multiplier unit.

FIG. 12 is a detail showing the multiplier segment feed mechanism of the preferred form of the multiplier unit.

FIG. 13 is a right side view showing in detail mechanisms for disabling a normally automatic and power-operated clearing mechanism and the initiation of a multiplication operation.

FIG. 15 is a detail of new mechanisms to be superimposed upon the mechanisms shown in FIG. 14, and shows the simple means required to provide the controls for the present invention, the parts being shown in a normal position.

FIG. 16 is a view of the parts shown in FIG. 15, immediately after the depression of a multiplier control key, when the machine has been conditioned for a split-multiplication operation.

FIG. 17 is a plan view of the multiplier control mechanisms shown in FIGS. 9, 14, 15 and 16.

I. PRIOR ART CALCULATING MECHANISM

Figure 14:
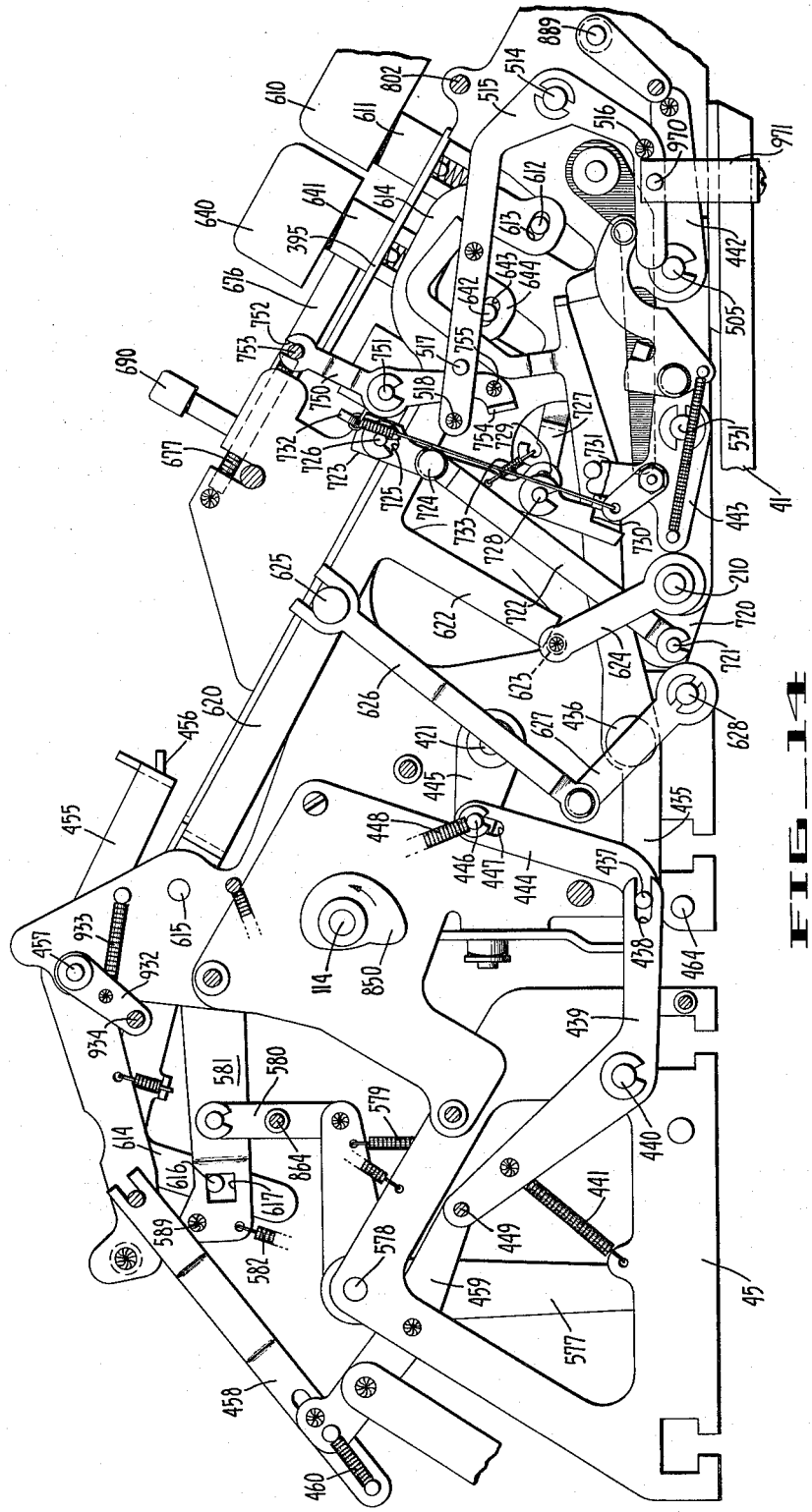
FIG. 14 is a left side view of the preferred machine, with covers removed, showing, for the most part, well-known Friden multiply control mechanisms.

The present invention is shown, for purposes of exemplification, as applied to the present Friden automatic calculating machine which is constructed in accordance with the patent to Carl M. Friden, No. 2,229,889 of January 28, 1941, as modified by a multiplying mechanism shown and described in the two patents to Carl M. Friden, No. 2,371,752 of March 20, 1945, and No. 2,399,917 of May 7, 1946. Some of the other features of the Friden automatic calculating machines which are essential to the present invention are covered by other patents which will be mention briefly when appropriate.

In view of the fact that many of the mechanisms involved in the present split-multiply operation of my invention are well-known parts of the present Friden machine, it is deemed sufficient to describe the known elements of these prior art machines very briefly, and I shall omit entirely those mechanisms that are not pertinent to a split-multiplying operation such as I propose.

It perhaps should be mentioned that the present invention, in its preferred form is an addition to the multiplying mechanism of the present Friden machine rather than a substitution therefor. It was indicated in the objects of this invention that I propose a mechanism by means of which I can multiply two five-digit multiplicands by a common five-digit multiplier without scrambling the products in a twenty-order register. This is accomplished by setting the first multiplicand factor in the right-hand five orders of the keyboard, setting the common multiplier factor in the multiplier keyboard, and then depressing one of the known multiplication initiating keys. When the split-multiplication control key has been set to its operative position, the resulting operation first sets the multiplier repeat mechanism to its operative position and modifies its setting so that when the multiplier carriage is released to escape to an adjusted position in the restore cycle, it escapes five orders to the left of the original position (the equivalent of automatically inserting five "0's" in the multiplier value). In the first phase of the split operation, the five-order multiplicand is multiplied by the five-digit multiplier, and the product is placed in the lower ten orders of the register. Then at the completion of the first multiplication, the multiplier repeat mechanism is effective to reset the multiplier value into the multiplier unit, and the escapement mechanism is effective to shift the multiplier carriage to the sixth ordinal position—in effect, automatically inserting five "0's" into the multiplier factor. Then the operator inserts the second multiplicand into the left-hand side of the main keyboard and depresses a multiplier control key to re-initiate machine operation. In this second phase, multiplication proceeds with the left-hand five orders of the main keyboard standing as a multiplicand, the five-digit multiplier standing in the sixth to tenth orders of the multiplier unit, and the product accumulates in the eleventh to twentieth orders. In this phase, the register normally is not cleared, and the position of the multiplier factor necessitates the shifting of the register carriage to the sixth ordinal position before multiplication can begin.

A. Machine frame

The preferred type of machine with which the present invention is associated is shown in FIG. 1. Machines of this type are generally constructed in two sections: A frame portion 40 and a shiftable register carriage 60, as shown particularly in this figure. The frame portion, insofar as the present invention is concerned, generally comprises a base plate 41 (FIGS. 9, 11, 13 and 15); a plurality of vertically and longitudinally extending frame plates mounted on the base 41, such as a right side frame plate 42 (FIGS. 3, 5, 7 and 8); a left side frame plate 43 (FIGS. 2, 8 and 11); and intermediate frame plate 44 (FIGS. 13 and 17), which lies in the forward portion of the machine and supports the left side of the keyboard and the right side of the multiplier mechanism; a left side control plate 45 (FIGS. 14 to 17), which supports a major portion of the multiplier control mechanisms; and an auxiliary left side frame plate 46 (FIG. 17), which lies between the left side frame plate 43 and the control plate 45 and supports a portion of the multiplier mechanism and controls associated therewith. The framework also comprises a number of crossbars which hold the two main frame plates 42 and 43 in rigid relationship, such as the forward crossbar 53 (FIGS. 3 and 13), front bearing plate 47 (FIG. 2), intermediate bearing plate 48, a bearing bracket 49, and a rear bearing plate 50. The rear bearing plate 50 carries a bearing bracket 51 which supports the carriage, as will be mentioned in the next paragraph. A crossbar 52 mounted at the top of the frame section immediately in front of the carriage 60 completes the framework of the machine. This framework carries the selection mechanism, the actuators, the drive mechanism therefor, and various control keys, as well as the carriage shifting mechanism and register clearing mechanism.

The carriage 60 contains an ordinally arranged accumulator register comprising accumulator dials 61, which are viewable through windows 62 in the carriage cover 63; and a counter, or quotient, register comprising ordinally arranged counter dials 64, which are viewable through windows 65 in the carriage cover. The carriage is shiftable with respect to the frame 40, so that the various orders of the accumulator dials 61 and counter dials 64 can be aligned with different orders of the selection mechanism for such operations as multiplication or division. The carriage, as shown particularly in FIG. 2, includes a main frame bar 66, which is slidingly supported upon the bearing bracket 51 affixed to the rear cross plate 50; a front carriage rail 67, which rides upon suitable bearings 68 mounted on crossbar 52; and a pair of end plates (not shown) which hold the frame bar and front carriage rail in spaced and parallel relationship.

Mounted in the main carriage frame bar 66 is a plurality of ordinally arranged dial shafts 71, upon the upper ends of which (above the frame bar) are mounted the respective accumulator dials 61. The respective dial shafts are also provided with an accumulator drive gear 72 mounted on the lower end of the shaft (below the frame bar). This mechanism is provided with a tens-transfer mechanism which is adequately disclosed and described in the Friden Patent No. 2,229,889, which, since it forms no part of the present invention, need not be described here. It can be mentioned here that the counter dials 64 are mounted upon ordinally arranged shafts 73, the rear ends of which are journalled in the frame bar 66 and the front ends of which are journalled in the front carriage rail 67. The several counter dials are actuated by gears 74 rigidly secured thereto, which are actuated by a counter actuator 75 which is adequately described in the above-mentioned Friden Patent No. 2,229,889. Since this counter mechanism forms no part of the present invention, it need not be described here.

B. *Selection and actuation mechanism*

Numerical values may be selected for entry into the accumulator register dials 61 by the depression of appropriate numeral keys 80 of a conventional "full keyboard," the keys of which are arranged in longitudinally extending ordinal rows and transverse value banks, as shown in FIG. 1. The individual keys of the keyboard (as best shown in FIG. 2) generally comprise a key top 81, which is solidly mounted on a key stem 82. The keys are severally mounted in a keyboard frame, which includes top plate 83 and bottom plate 84, the key stems being inserted through registering slots in the two plates. The keys are severally biased to a raised position by conventional springs 85 surrounding the key stems 82 and seated upon the top of the top frame plate 83 and against the lower face of the corresponding key top 81. In my preferred construction the keys of each bank are slidably mounted upon a pair of tie rods 86.

A series of ordinal key latches 90 is associated with the respective orders of the keyboard—the latches being slidably supported on the top face of the lower keyboard plate 84.

Each of the latches 90 is provided with a series of ten notches 91 through which the ten value keys ("0" to "9") are inserted. The latches are severally biased forwardly by a leaf spring 92 mounted on the rear wall of the keyboard frame plate. The key stems 82 are each provided with a cam face 93 which, upon depression of the key, forces the associated ordinal latch 90 rearwardly. A notch 94, located slightly above the cam face on the "1" to "9" keys, is adapted to engage the ordinal latch 90 when the notch registers with the latching slide. Thus, a key that is depressed to its full value position is latched in that position by the latching slide 90 engaging the notch 94 of the depressed key. It can be mentioned that the key is held depressed until released by a keyboard clearing mechanism next to be described.

The depressed key of any order can be released by the depression of the ordinal clearing, or "0," key 95. The key stem of this key is provided with the cam face 93 of the value keys 80 but does not have a notch 94 (see FIG. 4), so the key itself cannot be latched in a depressed position. Obviously the depression of this key, through the effect of cam 93 on the rear edge of its notch 91, forces the latching slide 90 rearwardly against the force of its spring 92 and thereby releases any key depressed.

All of the latching slides 90 can be forced rearwardly to clear the entire keyboard by means of a clearing bail 96 (FIGS. 3 and 4) which can be operated in a conventional manner by a keyboard clear key 97 (FIG. 1). Normally this bail is biased forwardly (clockwise in FIGS. 3 and 4) by a spring 98 tensioned between the upper edge of the bail 96 and a stud on the frame plate 42, as shown. When this bail is rocked (counterclockwise in these figures) by depression of the keyboard clearing key, an integral flange 100 at the upper end thereof engages flanges 101 formed on the forward ends of the several latching slides 90. The bail 96 is pivotally mounted in the machine as upon shaft 99 carried by the right frame plate 42 (FIG. 3) and the intermediate frame plate 44 (FIG. 13). The clearing bail 96 can also be operated automatically and by power in some instances, as will be described hereafter in Section D entitled "Add Key Mechanism."

Each of the key stems 82 is provided with a laterally extending pin 87 located adjacent the lower end thereof. These pins are adapted to engage differentially angled cam faces 105 of conventional V-notches of a pair of selection bars 106 and 107. In the machine of the Friden patents above-mentioned, two selection bars are used with each order of the machine—the bar 106 serving the "1" to "5" keys and the bar 107 serving the "6" to "9" keys. Each of the selection bars 106 is provided with a laterally extending yoke 108 and the selection bars 107 are provided with a similar laterally extending yoke 109. These yokes respectively engage an annular notch in the hub of a ten-tooth selection gear 110 (as is best shown in FIG. 2). Both of the selection gears of each order are mounted upon a common square, or selection, shaft 111 which is journalled in the bearing plates 47, 48 and 50. Thus, the differential angle of the cam faces 105 of the V-notches of the respective selection bars provides a differential longitudinal, or axial, movement of the selection gears 110 along their respective square shafts 111, as is well-known in this art.

Associated with the selection gears 110 are conventional Thomas-type actuators 112. These actuators are mounted upon longitudinally extending actuator shafts 113, which are constantly geared to a common drive shaft 114 through miter gearing 115, 116. It is conventional in machines of this type to rotate the drive shaft 114 through a complete revolution with each cycle of the machine, and the gearing is such that the actuators 112 likewise perform one complete revolution. The actuators, as is conventional, are provided with nine differentially stepped teeth which are adapted to engage the teeth of the selection gears 110 for differential rotation of the latter, corresponding to the axial position of the selection gears on their square shafts 111. Thus, the positioning of the selection gears 110 on the square shaft 111, from depression of a value key, will, when the shaft 114 is rotated, cause a differential rotation of the square shaft 111 for a corresponding angle.

Adjacent the rear of each square shaft 111 is a digitation control, or, as it is commonly called, a "plus-minus," spool 118. This spool is provided with a plus gear 119 and a minus gear 120, both of which are adapted to mesh with the ordinally related dial gear 72 when the sleeve 118 is displaced from the central position shown in FIG. 2. The spool is slidably mounted on the square shaft 111 and can be adjusted longitudinally of that shaft by means of a digitation control gate 121, which is mounted on a digitation control shaft 122, as by conventional arms 123. The shaft 122 can be rocked, and consequently the bail, or gate, 121 can be shifted to position the spool 118 in either the additive or the substractive position by various operation control keys, such as the plus key 124 (FIG. 1) or the minus key 125. Since the various digitation control keys, other than those relating to multiplication operations, play no part of the present invention, such mechanisms will not be described herein, but reference can be made to the Friden Patent No. 2,229,889 for a full disclosure thereof. The control of this shaft from the multiplication control keys will be described subsequently in relation to the control of multiplication operations under Section H entitled "Multiplication Mechanism."

C. Drive mechanism

The main drive shaft 114 of the preferred form of my machine is driven by an electric motor (not shown herein) and connecting gearing through the medium of a conventional clutch 130 (FIG. 5). The driving member of the clutch just mentioned includes a gear and integral ratchet 131 rotatably mounted on the right end of the drive shaft 114. The driven member of the clutch is a disk, or plate, 132 which is rigidly secured to the shaft 114. This plate carries a clutch dog 133, which is resiliently biased into engagement with the ratchet portion of the gear 131, so that when the clutch dog 133 is released by a clutch control lever 134, the engagement of the dog with the ratchet causes the driving gear 131 to impart like rotation to the pltae 132, and hence to the drive shaft 114.

The clutch control lever 134 is pivotally mounted on the right side frame plate 42 by any suitable means, such as stud 135, and is operated by means of a link 136. This link is operated by various control keys of the machine, but the only one of interest in the present invention is through the means of a lever 137, likewise pivotally mounted on the right side frame plate 42 by any suitable means, such as stud 138. The lower end of this lever is connected to a motor switch control rod 139 by means of a long pin 140 which extends through an aperture in the frame plate, as shown in FIGS. 3 and 5. Obviously, any rocking of the lever 137 (counter-clockwise in FIG. 3 and clockwise in FIG. 5) imparts a similar rotation to clutch control lever 134, thereby disengaging the clutch control lever from the clutch dog 133 and enabling the clutch dog to engage the drive ratchet. Such motion of the lever 137 likewise imparts forward movement to the switch control rod 139, thereby closing the switch and starting the motor. In the present invention this movement is secured by the rocking of a lever 141 (FIG. 3), which is pivotally mounted on a transverse shaft 220 extending across the machine. The lever 141, in turn, is operated by rocking of an arm 142, which is rigidly mounted on a second transverse shaft 210. The arm 142 carries a pin 143 which engages a cam edge on the forwardly extending arm of the lever 141, so that the rocking of shaft 210 (counter-clockwise in FIG. 3) rocks the lever 141 in the opposite direction. Thereupon a hook extension 144 on the rear end of the lever 141 engages the pin 140 to impart the necessary rocking to lever 137 and the forward translation of switch control link 139. The rocking of the shaft 210 will more logically be described in connection with the control keys of the multiplier mechanism, and hence such a description will be found under the heading of "Multipliction Mechanism" in Section H.

D. Add key mechanism

It is customary to provide machines of this type with what is commonly known as an "add" key mechanism. This is a mechanism which can be set to an operative or an inoperative position by the operator and, when set to an operative position, is effective to operate the keyboard clearing bail 96 just before the end of each cycle of operation. In the machine of the patents above-mentioned, this mechanism is selectively conditioned for operation or nonoperation by means of a key 270 (FIGS. 1, 3 and 5) pivotally mounted on the framing of the machine and detented in either position by a usual form of detent. The key arm 271 is connected by means of a link 272 to a bellcrank 273 pivotally mounted on the right frame plate 42 by some suitable means, such as stud 274. The lower arm of the bellcrank 273 engages a slide 275 which is slidably mounted on the right side of the frame plate and which carries a pin 276 extending through an aperture in the frame plate to engage a slot 277 in an operating link 278 (see FIG. 3).

The rear end of the operating link 278 is pivotally mounted on a cam follower 279, likewise mounted on the frame plate 42, as by stud 280. The lower end of the cam follower is engaged by a pin 281 mounted on a disk 282 carried by the main drive shaft 114. Hence the follower 279 is rocked just before the end of each cycle of operation by the engagement of the pin 281 with the lower end of the follower arm, and such rocking of the follower arm pulls the operating link 278 rearwardly. The forward end of the operating link is formed as a hook, or shoulder, 285 adapted to engage a pin 286 carried by an arm 287 (see FIG. 5 also) pivotally mounted on the right side of the frame plate 42, as by stud 288.

When the "add" key 270 is in its forward, or operative, position shown in these figures, the forward end of the operating link 278 is dropped (as shown in FIG. 3) so that the hook thereon can engage pin 286. However, when the "add" key is rocked to its rearward, or inoperative, position, the forward end of the operating link is lifted away from engagement with the pin 286. The arm 287 carries a floating link 289, as shown in FIG. 5, which is pivotally mounted thereon by some suitable means, such as stud 290. The forward end of this floating link is biased upwardly, as by spring 291, to engage a shoulder formed on the right end of the clearing bail 96. By this mechanism, when the "add" key is in its forward or operative position, the keyboard clearing bail 96 is rocked immediately before the end of each cycle of operation, through the reciprocation of live link 289.

It is customary in these machines to provide means for disabling the "add" key mechanism in multicyclic operations, such as division or multiplication, until the final cycle of the operation. The usual disabling means comprises a bellcrank-type lever 295 (FIG. 3) pivotally mounted on the left side of the right-hand frame plate 42 by some suitable means, such as stud 296. This lever carries a downwardly projecting arm 297 which is adapted to be engaged by a roller 146 carried on the third arm 145 of the lever 141. It is obvious that as the lever 141 is rocked from the rocking of shaft 210, the roller 146 on arm 145 rocks lever 295 (in a counter-clockwise direction in FIG. 3). When so rocked, a pin 298 carried by the forward end of the lever 295, and which extends through an aperture in the frame plate, engages the rear end of a rocker 299 (FIG. 5). The rocker is preferably mounted on the stud 288, which also pivotally supports the arm 287. The forward end of rocker 299 engages a pin 300 carried by the floating link 289. It is obvious that the rocker 299 is rocked (counter-clockwise in FIG. 5) by the rocking of arm 145 and lever 295 (the arm 145 rocking clockwise and the lever 295 rocking counter-clockwise in FIG. 3). When so rocked, the forward end of rocker 299, through its engagement with pin 300, depresses the forward end of the floating link 289. When that happens, the link no longer engages the right end of bail 96, and hence is ineffective to clear the keyboard.

It should be noted that in multiplication operations the shaft 210, which controls the operation of this disabling means, is rocked upon depression of a multiplication key and is latched in the rocked position until slightly before the mid-point of the final cycle of a multiplication operation. Hence, throughout a multiplication operation the "add" key mechanism is disabled until the final cycle of operation. It is, therefore, obvious that the keyboard is cleared at the final cycle of the multiplication operation but not prior thereto.

E. Carriage shifting mechanism

It has already been mentioned that the carriage 60 is shiftable transversely of the frame 40 of the machine in order to permit operation of various orders of accumulater dials 62 by the selection and actuation mechanisms heretofore described. The shifting mechanism is best shown in FIGS. 2, 7 and 8, and is essentially that shown in the patent to Carl Friden, No. 2,313,817, issued March 16, 1943, as modified by the patent to Morton Matthew, No. 2,679,916 of June 1, 1954. It will be recalled that the actuator shafts 113 all rotate synchronously in the same direction (counter-clockwise when viewed from the front of the machine), and each makes a complete revolution with each revolution of the main drive shaft 114. Leftward shifting of the carriage is conventionally controlled by a left shift clutch driver 150 (FIG. 7), which is mounted on the rearward end of the second drive shaft 113 from the right; and rightward shifting of the carriage is controlled by a similar clutch driver 151 which is mounted on the rear end of the rightmost actuator shaft 113. Preferably the shift clutches are of the type disclosed in the patent to Matthew, No. 2,679,916, mentioned above. The operation of these clutches is controlled by the positioning of a left shift control bar 152 and a right shift control bar 153, respectively. These control bars are both biased toward the front end of the machine by a spring 154 surrounding the front end of the bar and seated between the front bearing plate 47 and a collar adjacent the front end of the bar. Both are axially movable toward the rear of the machine by various control means, none of which are important to the present invention except the one relating to the multiplying mechanism, and that can best be described in connection with the multiplier controls.

Associated with each of the clutch drivers 150 and 151 is a notched plate 155 and 156, respectively, adapted to be engaged by the rockable tongue of the associated clutch driver. The disk 155 is mounted on the forward end of a shaft 157 journalled in the rear bearing plate 50 and a bracket 158 (see also FIGS. 2 and 4). This shaft carries a gear 159 which meshes with the enlarged section 160 of a compound gear 160, 161. The disk 156 associated with the clutch driver 151 is similarly mounted on a shaft 162 journalled in the rear bearing plate 50 and bracket 158, and carries adjacent its rear end a gear 163. The gear 163 lies rearwardly of the plane of the gear 160 but is entrained with the latter through a wide idler 164, as best shown in FIGS. 2 and 7. Thus, while both shafts 111 and the two clutch drivers 150 and 151 mounted thereon rotate in the same direction, the gear trains connected with the disks 155 and 156 are effective to reverse the rotation of the compound gear 160, 161. The small gear section 161 of the compound gear, as shown in FIG. 8, meshes with a shift gear 170, which is rigidly mounted on a shaft 171, likewise journalled in the rear bearing plate 50 and the bracket 158. This shaft also carries a shift plate 166 rigidly mounted thereon, which plate carries four equiangularly spaced pins 167 extending forwardly therefrom. These pins are adapted to engage ordinarily spaced notches 168 in a shift rack 169 mounted on the rear of the carriage frame bar, as is best shown in FIGS. 2 and 8. Hence, the rotation of the disk 166 in either direction, as determined by the operation of the shift clutch 150 or 151, is effective to selectively shift the carriage 60 in a selected direction.

F. Register clearing mechanism

The register clearing mechanism utilized in the machine with which my invention is preferably associated is described in a number of patents, and particularly the one to Friden, No. 2,229,889, already mentioned. Briefly, it comprises a mutiliated clearing gear 180 (FIG. 2) mounted on each accumulator dial shaft 71. These gears are adapted to be engaged by a multilated clearing rack 181 upon longitudinal displacement of the rack to the right, as by means of the conventional clearing knob 182 (see FIG. 1). Similarly, the counter dials are cleared by means of a multilated clearing gear 183 (FIG. 2) on each dial shaft 73 adapted to be engaged by the teeth of a mutilated clearing rack 184 upon movement of the latter to the right, as by the manual operation of its clearing knob 185 (FIG. 1).

It is also customary in the machine with which my invention is preferably associated to provide means for clearing either or both registers by power by various means, one of which will be described in the next section. This power operation of the clearing mechanism is conventionally secured by the translation of a power-operated clearing bar 186 (FIGS. 2 and 8), which is slidably mounted on the upper rear corner of the carriage frame bar 66. This bar is normally biased toward the left (to the right in FIG. 8) by a spring 179, and can be shifted to the right by a cam-driving means to be described in the succeeding paragraphs. For the moment it can be mentioned that the right-hand end (to the left in FIG. 8) carries a bracket (not shown in these figures but described and shown in the patent to Friden No. 2,294,083, issued August 25, 1942), which bracket is adapted to engage arms carried by the respective clearing knobs, whereby either clearing rack can be selectively disengaged or engaged, at the will of the operator.

The rack is operated through the medium of a clear clutch driver 187 (FIG. 7), such as the clutch driver described in the patent to Matthew, No. 2,679,916, of June 1, 1954. This clutch driver is controlled by the operation of a telescoping bar 188, which is biased toward the front of the machine by a suitable compression spring 189 seated around the forward end of the bar between the front bearing plate 47 and a collar carried by the bar. The rear end 190 of the bar carries a clutch operator 191. A spring 192, seated between the clutch operator member 191 and a collar carried by the forward portion of the bar, holds the operator at the extended position—which, in the normal forward position of the bar 188, holds the clutch driver inoperative. It can be mentioned here that normally (so long as the carriage 50 is in any ordinal position other than the extreme left-hand position shown in FIG. 1) the clutch operator is locked forwardly in an inoperative position by means of a bellcrank latch lever 193 (see FIG. 8). The bellcrank latch is pivotally mounted on a bracket 194 mounted on the rear bearing plate 74 by any suitable means, such as screw studs 195. This bellcrank latch is resiliently biased to a blocking position by any suitable means, such as a spring 196 tensioned between an ear on the lower arm of the lever and a pin on the bracket 194. The bellcrank, however, can be rocked (clockwise in FIG. 8) by a pin 197 carried by the shift rack 169 and so positioned that it engages the upper arm of the bell crank 193 only as the carriage rack (and consequently the carriage) is shifted from its next to the extreme left-hand position to its extreme left-hand position. When the bellcrank 193 is so rocked (clockwise in FIG. 8), the forwardly projecting finger 198, which normally registers with the clutch operator 191, is rocked away from engagement with the clutch operator. If, at that moment, the clearing bar 188 (FIG. 7) is in its rearward operative position, the clutch operator 191 then becomes effective to so position the clutch driver 187 that it will engage its driven member, or disk, 199. The driven disk 199 is rigidly mounted on a shaft 200 (FIG. 8) which is journalled in the rear bearing plate 50 and the bearing bracket 194. The shaft 200 also carries a clearing cam 201 that is rigidly mounted thereon. A follower arm 203 is associated with the clearing cam 201, the arm carrying a follower roller 202 that engages the periphery of the cam. The follower arm is pivotally mounted on the rear bearing plate 50 by any suitable means, such as stud 204, and is biased into engagement with the cam 201 by a suitable spring 205. The upper end of the follower arm 203 engages a pin 206 carried by a bracket 207 mounted on the clear bar 186 in such a position that the arm 203 will engage the pin 206 when, and only when, the carriage 60 is in its extreme left-hand position, shown in FIGS. 1 and 8.

G. Left shift and clear programming mechanism

It is customary in the machine with which my invention is preferably associated, to shift the carriage 60 to the extreme left-hand position (shown in FIG. 1) and then to normally operate the clearing mechanism, from the depression of any of the multiplier control keys. This is secured, in the preferred machine, by the rocking of a transversely extending initiating shaft 210 (FIGS. 3 and 7). The rocking of this shaft (counter-clockwise in FIG. 3) is effective to initiate machine operation, as has already been described under the heading of "Drive and Clutch Mechanism." Such rocking of this shaft also is effective to operate a programming mechanism which is best shown and described in the patent to Machado, No. 2,650,761, issued September 1, 1953, but enough is shown in FIG. 7 to briefly describe this mechanism. The shaft 210 is rocked by the multiplier control keys, as will be discussed under the heading of "Multiplication Mechanism" in the next section. For the moment, it can be noted that the shaft 210 carries an arm 211 rigidly mounted thereon. The arm, in turn, supports the forward end of a link 212, the rear end of which is connected to one arm of an eccentrically mounted bellcrank 213. The bellcrank is rotatably mounted on an eccentric carried by auxiliary drive shaft 214, which is directly geared to the main drive shaft 114, as by means of miter gears 215, 216 (FIG. 11), an intermediate shaft 217, and a miter gear 218 which meshes with the highest order miter gear 116 on the main drive shaft 114. Thus, the eccentric 213 oscillates constantly during machine operation. In most operations such oscillation is of no importance, as the eccentric bellcrank 213 is so angularly positioned that it is ineffective upon the parts associated with it. However, when the eccentric bellcrank is rocked, by means of arm 211 and link 212 upon rocking of shaft 210, a hook on one of its arms, at the extremity of its stroke, is adapted to catch a pin carried by an arm 219 (FIG. 7) rigidly mounted on shaft 220. When the eccentric 213 is so rocked and the arm 219 is so hooked, the shaft 220 is rocked from the oscillation of the eccentric. The shaft 220 carries a second arm 221 pinned thereto. This arm 221 carries a pivotally mounted pusher link 222, the rear end of which is provided with a suitable shoulder that engages a pin 223 mounted on an arm which forms the left end of a spool 224. The spool 224 is pivotally mounted on a transverse shaft 229 journalled in a bracket extending from bearing plate 47. The right end of the spool 224 is formed as an arm which carries a rightwardly extending pin 225 which engages the front arm of the left shift control rod 152. Thus, the rocking of the shaft 220 is effective to rock the spool 224 (counter-clockwise when viewed from the right) and thereby translate the shift control rod 152 rearwardly and initiate a leftward shifting of the carriage.

The shaft 220 also carries an arm 226 adjacent the left end thereof, the arm being rigidly mounted on the shaft. This arm supports the forward end of a pusher link 227, the rear end of which is provided with a shoulder engaging the forward end of the clear clutch control rod 188. Hence, the rocking of the shaft 220 is also effective to translate the clear clutch control rod 188 rearwardly, although the telescoping operator 191 on the rear end thereof is held forwardly by the latching means previously described. It can be noted here that the programming mechanism just described is latched in an operative position by a latch member 228 which is disabled when the shaft 210 and arm 211 are returned to their original position, as the arm 211 carries a pin which releases the latch. The left shift and register clearing mechanisms are latched in an operative position so long as the shaft 210 is rocked, and it can be mentioned here that the shaft is held in a rocked position until a multiplication operation is completed and the control key is released from its latch, as will hereinafter be described.

The continuous leftward shifting of the carriage thus initiated is terminated, in all multiplication operations, when the carriage reaches the extreme left-hand position shown in FIG. 1. This termination of the shifting operation is achieved in the machine of the patents above-mentioned by mechanism best shown in FIGS. 7 and 8. This mechanism comprises an override pawl 235 (see FIG. 8), which is pivotally mounted on the right end (to the left in FIG. 8) of the shift rack 169 by any suitable pivotal mounting, such as stud 236. This pawl is provided with a notch which serves as the terminal notch in the shift rack 169 and is biased (clockwise in FIG. 8) to the position in which the notch is in alignment with the notches 168 of the rack, as by a spring 237. However, when one of the pins 167 engages the notch of the override pawl 235 and a further shift of the carriage is attempted to the left (to the right in FIG. 8, which is a rear view of the shifting mechanism), the adjacent pin engages the lower face of the pawl and rocks it against the force of spring 237. When so rocked, a nose 238 on the extreme right end of the pawl engages a shelf, or bracket, formed at the upper end of a slide 239 (see FIG. 7 also). This slide is resiliently biased to its upper position shown in both figures by any suitable spring, such as the tension spring 240, and is slidably mounted on the rear bearing plate 50 by any suitable means, such as pin-and-slot mounting 241. The lower end of the slide engages a rearwardly extending arm of a bellcrank 242 that is pivotally mounted on some suitable support, such as on the digitation control shaft 122. A lower arm of the bellcrank is pivotally connected to a forwardly extending link 243, the forward end of which link is pivotally connected to an upwardly extending leg of a bail 244. Preferably this bail is mounted on the transverse shaft 220 (as best shown in FIG. 7) and is formed with an offset left leg 245 extended rearwardly from the shaft 220 and then to the left to a point adjacent the intermediate frame plate 44. This extended leg 245 underlies the pusher link 222 that controls the operation of the left shift clutch control rod 152 and the pusher link 227 which controls operation of the shift clutch control rod 188—both of which were set by the rocking of the shaft 220. Thus, the operation of the override pawl 235 (FIG. 8), when the carriage reaches the extreme left-hand position shown in FIG. 1 (the extreme right-hand position shown in FIG. 8), rocks the bellcrank 242 and hence bail 244. Thereupon the extension 245 of the bail lifts the two pusher links 222 and 227, so that they release the sleeve 224 and the clutch control rod 188, respectively. When the sleeve 224 and the rod 188 are thus released, the spring 154 on the left shift control rod 152 and the spring 189 on rod 188 immediately snap the control rods to their forward position, so that the return of the override pawl to its normal position, and hence the return of the bail 244 to the normal position shown, leaves the two pusher links 222 and 227 riding upon the pin 223 and rod 188, respectively, with their shoulders disengaged therefrom. Thus, they exert no further control upon these clutches, even though the shaft 220 remains in its rocked position until the end of the program of operations controlled by the multiplier keys.

Incidentally, it can be mentioned that it is customary in the Friden machine to provide a mechanism for "split-clearing," the term being used to mean a power clearance of the right-hand end of the accumulator register without clearing the left-hand end thereof. These machines use the mechanism described in the patent to Machado et al., No. 2,666,582, issued January 19, 1954. Heretofore in these machines it has been customary to split the clearing mechanism between the ninth and tenth orders, or between the seventh or eighth, as the purchaser of the machine desired. In my invention it is essential that the split be between the tenth and eleventh orders as is indicated by the indicia 230 (FIG. 1) above the register dials. This change in the location of split-clear is due to the fact that if split-clearing is desired in connection with "split-multiplication" operations, the clearing will be effective to clear out one of the products completely while leaving the other product untouched.

H. Multiplication mechanism

It can be mentioned at the outset of the discussion of the multiplier mechanism that it is, almost in its entirety, substantially the same as that disclosed in the Friden multiplier patents, Nos. 2,371,752 and 2,399,917, already mentioned. Insofar as these mechanisms are modified, it is done almost entirely by the addition of new parts to effectuate new controls for this old and well-known mechanism. The entry of multiplier values is made through a multiplier selection unit in the lower, or front, left-hand corner of the machine. Such a selection mechanism ordinarily comprises three main sections:

(a) The keyboard
(b) The shiftable pinboard
(c) The multiplication control segments In my invention these are utilized without change from the calculating machine made under the teaching of these patents. Hence, the selection mechanism will be very briefly described, reference being made to these patents for a full and complete disclosure of the mechanisms involved.

1. MULTIPLIER SELECTION

The multiplier keyboard comprises the nine digital value keys 393 (FIG. 1) and a "0" key 394. The value keys 393 are arranged in the usual 3 x 3 square with the "0" key 394 placed in front of them. All of these keys are mounted on stems (not shown) which are slidably mounted in a keyboard frame comprised in part by an upper frame plate 395 and a lower frame plate 396 (FIGS. 9, 11 and 13). These keys are all urged to their upper, or inoperative, position by customary springs, not shown. Depression of the "0" key 394 is effective only to release a multiplier carriage escapement mechanism, not shown herein; the depression of the "9" key is effective to operate the escapement mechanism and also to operate a "0" latch 400 (FIG. 9) by means of a mechanism not here shown but fully shown and described in the patents mentioned; and depression of the "1" to "8" value keys 393 is effective, in addition to the release of the "0" latch 400 and the operation of the escapement mechanism, to rock setting arms 397 (the tips of which are seen in FIG. 9) to set a value pin 401 carried by a multiplier control carriage 398.

The value pins 401 are, in the machine with which my invention is preferably associated, mounted in the multiplier carriage 398. In the preferred form of construction there are ten orders of pins 401, with eight pins in each order. When the multiplier carriage 398 is in its home position, the highest order of pins 401 is in alignment with the noses 397 of the bellcranks operated by the multiplier value keys. The pins 401 are slidably mounted in aligned apertures in a pair of spaced parallel carriage plates 402 (only the lower one of such plates being shown in FIG. 9), the two plates being secured to end plates 403 that are held in spaced relationship by a number of tie rods, such as the shaft 404 on which the "0" latches 400 are mounted. The multiplier carriage is slidably mounted on a pair of rails 405 and 406, and is biased to the left by means of a spring-powered lever arrangement including a three-armed lever 407 (see also FIG. 17) pivotally mounted on the base plate 41. An upwardly extending arm on the rearwardly extending arm of lever 407 engages the right side frame plate 403, while the forwardly extending arm seats a spring 408 which extends transversely across the front of the machine. An escapement mechanism, not illustrated herein but fully shown and described in the Friden multiplier patents, Nos. 2,371,752 and 2,399,917, enables the escapement of the carriage one order to the left upon operation of one of the multiplier value keys 393 or "0" key 394. As the escapement mechanism is operative the carriage is shifted one order to the left, whereby a new row of pins 401 comes into alignment with the operating levers 397 of the selection mechanism.

The multiplier carriage 398 carries a series of selection segments 399 that are ordinarily mounted on a shaft 409 supported in the end plates 403 and which, incidentally, also serves as one of the tie rods of the carriage 398. Each of these segments is biased to an extreme value position of "9" by a spring 410 extending around a hub, not shown, and tensioned between a stud on the segment and another on the multiplier carriage. Each segment carries a dial 411 which is visible through a window 416 (FIG. 1) as the carriage is escaped one order to the left from its home position. These segments are coordinally arranged with the respective orders of value pins 401 and with the ordinally arranged "0" latches 400 that are rotatably mounted on the shaft 404. A nose on each segment engages its coordinal "0" latch 400 and is thereby held in a "0" value position. When the "0" latch is operated from the depression of one of the value keys, the segment is released to the force of its spring 410, whereupon it will rotate toward an extreme value position (counter-clockwise in FIG. 9) until it is stopped by the one of the pins 401 which has been projected upwardly by the rocking of its associated lever 397, or in the case of the value of "9," until the segment is brought to rest by engaging a tie rod of the frame.

These segments control the number of cycles of operation in the respective orders of the multiplication operation, as will now be explained.

2. MULTIPLIER OPERATION

Multiplication in the "Friden" machine is by the repeated addition method in which a digitation operation is performed a number of times depending upon the multiplier value of that order. For the moment we can disregard the question of whether such digitation is additive or subtractive in nature for that phase of the invention will be described below in subsection 3, "Multiplication Control Keys." For the moment we can ignore the sign character of the operation and direct our attention to the means for counting the number of cycles in each order of operation, for that operates in the same manner in both instances. This mechanism is best shown in FIG. 12.

It will be noted that each segment 399 is provided on its rear edge with a series of rack teeth 412. These teeth are adapted to be engaged by a holding pawl 420 which is rigidly mounted on a transverse shaft 421 which extends from the auxiliary frame plate 45 to the left side control plate 46. Normally the shaft 421 and the holding pawl 420 are held in the inoperative position shown in FIG. 12 by the resilient control mechanism to be described in the next paragraph. It should be noted here, however, that the shaft 421 and the holding pawl 420 are resiliently biased to an operative position (counter-clockwise in FIG. 12) by a resilient means likewise described in the next paragraph, so that the ear on the holding pawl will engage the rack teeth 412. Normally, however, both are held in the position shown, in which case the ear 422 on the holding pawl rocks a feed pawl 423 away from the rack of the multiplier segment 399, as shown. The feed pawl 423 is pivotally mounted on an oscillating arm 424 by any suitable means, such as pivot stud 425. The rear end of the oscillating arm is pivotally mounted on any suitable means, such as a pin (not shown) carried by a bracket affixed to the base plate. The arm 424 is connected to an eccentric cam follower 427 which embraces an eccentric cam 428 rigidly mounted on the main drive shaft 114. Thus the arm 242 oscillates with each cycle of machine operation and consequently the feed pawl 423 reciprocates with each cycle of operation. Feed pawl 423 is resiliently biased toward engagement with the ratchet teeth 412 on the segment 399 by a suitable spring 429, but normally is held from such engagement by the holding pawl 420.

The multiplication operation itself is controlled by the rocking of a spring-powered operating lever 435 (FIG. 14) that is pivotally mounted on the left side control plate 45 by any suitable means, such as pivot stud 436. A pin 437 on the rear end of this arm is embraced within a slot 438 formed in the forward end of a rocker 439 which is pivotally mounted on the control plate by any suitable means, such as pivot stud 440. A strong spring 441 tensioned between a seat in the rearward arm of the rocker and a seat in the control plate biases the two levers 439 and 435 to an operative position (the rocker 439 counter-clockwise and the lever 435 clockwise in this figure). The control lever 435 is latched in an inoperative position by two latches 442 and 443, the operation of which will be described later in this section. A link 444 connects the pin 437 with an arm 445 that is rigidly mounted on the left end of the shaft 421, being connected to this arm by a pin-and-slot connection which includes the pin 446 on the arm which is embraced by a slot 447 in the link. A spring 448 tensioned between the pin 446 and a stud, not shown, on the control plate resiliently biases the shaft 421 to its operative position (clockwise in FIG. 14 and counter-clockwise in FIG 12). Normally the shaft 421 is held in an inoperative position by the link 444 and its control lever 435. However, when the lever 435 is enabled to rock, the link enables the arm 445 and shaft 421 to rock to their operative positions.

At the end of each ordinal series of operations the shaft 421 and the holding pawl 420 are rocked from engagement with the then operative segment 399, so that in the next cycle of operation the multiplier carriage 398 and the register carriage 60 can each be shifted one order to the right. This is most readily accomplished by means of a shift control arm 455 (FIGS. 9 and 14), an ear 456 on the front end of which is adapted to be engaged by the upper end of the rack section 412 of the then operative segment 399. This lever is pivoted on a stud shaft 457 that extends between the auxiliary frame plate 46 and the left side control plate 45. Normally the shift control lever 455 is held in an inoperative position by means of a resilient link 458 which has a pin-and-slot connection with the lever 455 and also with a setting lever 459 that has a pin-and-slot connection with the spring-powered rocker 439. Thus the rocking of the initiating levers 435 and 439 resiliently biases the shift control lever 455 to its operative position (clockwise in FIGS. 9 and 14). If a value stands in the operative value segment 399 the segment is, of course, rocked (counter-clockwise from the position shown in FIG. 9) so that the shift control lever 455 is enabled to rock clockwise from the force of spring 460 (FIG. 14) which holds the link in a retracted position with respect to the rocker 459. In this position the shift control lever is in an inoperative position and digitation proceeds. If, however, the lever 455 is held in the counter-clockwise position, or when it is rocked to that position by the return of the operative segment 399 to the "0" position shown, it becomes effective to disable the feed pawl and to enable the shifting mechanism.

This operation is secured by means of a link 461 (FIG. 9) suspended from the rear end of the lever 455, the lower end of which link is connected to a hook link 462. The forward end of the hook link 462 is pivotally mounted on the cam follower arm 463 that, in turn, is rotatably mounted on a transverse shift control shaft 464. Early in the fourth quarter of a cycle of operation the upper end of the arm 463 is engaged by a roller 465 carried by a cam 466 mounted adjacent the left end of the main drive shaft 114. The rear end of the link 462 is formed with a shoulder 467 which engages an ear on a latch member 468 that is pivotally mounted on a transverse shaft 469 and is biased to a latched position by any suitable means, such as spring 470. The latch 468 is provided wtih a shoulder which underlies an offset section of an arm 471 that is pinned to, or otherwise rigidly secured on, the shaft 464. The shaft 464 carries a second follower arm 472 which is pinned thereto. A relatively strong spring 473 seated on a stud on the arm 472 and a stud on the frame plate strongly biases the arm 472 and shaft 464 to an operative position (counter-clockwise from that shown in FIG. 9). A pin 474 on the arm 471 is embraced within a slot of a link 475. This link is pivotally mounted on an arm 476 that is rigidly mounted on the shaft 421. It is well-known that the first follower arm 463 is rocked and the hook link 462 is reciprocated with each cycle of machine operation. Whenever the shift control lever 455 is in the digitation position (clockwise from that shown in FIG. 9) the hook 467 is held above the ear on latch 468. However, when the lever 455 is rocked by the operative one of the segments 399, the hook link 462 is lowered so that the hook 467 engages the ear of latch 468. Thereupon, in the last quarter of the cycle, the latch is rocked away from the arm 471 and the spring 473 becomes effective to rock the assembly consisting of that arm, shaft 464 and arm 472. When this happens the link 475 and arm 476 are effective to rock the feed control shaft 421 (counter-clockwise in FIG. 9 and clockwise in FIG. 12) to disable the feed pawl.

The rocking of the shaft 464 is also effective to initiate the shift mechanisms which control the shifting of the multiplier carriage 398 and the register carriage 60. The shaft 464 extends transversely across the machine, actually being journalled in the left side control plate 45, the left side frame 43 and the right side frame 42. At a point adjacent the left side frame 43 it carries an arm 480 (FIG. 11) that is pinned to, or otherwise mounted thereon. A pin 481 on the forward end of this arm is embraced within an annular groove 482 in a collar 483 that is slidable along the intermediate shaft 217 but is nonrotatably mounted thereon. Thus the collar 483 rotates with the shaft 217 but can be shifted axially along it by the rocking of arm 480 and shaft 464. A feed pawl 484 is mounted on an eccentric portion of the collar 483, its rear end being pivoted on a stud 485 carried by a bracket 487. The front end of the pawl 484 is adapted, when the collar and pawl 484 are lifted by the rocking of arm 480, to engage the teeth of a shifting rack 486 that is mounted on the rear edge of the multiplier carriage 398. It will be obvious that the feed pawl 484 oscillates constantly with each cycle of machine operation but normally lies in a plane below the feed rack 486, so that such oscillation is ineffective. However, when the shaft 464, and hence the arm 480, are rocked (clockwise in FIG. 11), the front end of the feed pawl 484 is shifted into the plane of the feed rack 486 and hence will shift the multiplier carriage 398 one ordinal space with each cycle of machine operation.

Adjacent the right end of the shaft 464 it carries an arm 490 (FIG. 7) that is slidably and rotatably mounted thereon. A spring 491 resiliently biases the arm 490 toward the left. Normally such movement is blocked by means of a bail 492 that is slidably mounted on the shaft 464, the left end of the bail engaging the right frame plate of the multiplier carriage. Hence the arm 490 is normally forced to the right against the force of spring 491 by the multiplier carriage being in its home position. As soon as the multiplier carriage is escaped to the left, however, the arm 490 can shift to the left from the force of spring 491, and when so shifted becomes effective to control a right shift operation. In its normal position the arm 490 lies to the right of a pin 493 that is carried by an arm 494 that is rotatably mounted on the shaft 229. However, when the arm 490 is shifted to the left it lies in a plane adapted to engage the pin 493, so that when the arm is rocked, it forces the pin 493 and hence the right shift control rod 153 rearwardly and thus initiates a right shift operaiton. Such rocking of the arm 490 is secured by means of an arm 495 that is pinned to, or otherwise rigidly secured on, the shaft 464. This arm carries a long pin 496 that is embraced within a slot formed in the shift arm 490. This construction, therefore, enables the rocking of the shift control arm 490 with each rocking of the shaft 464, but such rocking is ineffective unless, and until, the multiplier carriage 398 has been shifted to the left. By this means the register carriage 60 is shifted one order to the right at the end of each ordinal series of operations until the carriage is returned to its home position. Thereafter, although the shaft 464 is rocked once more to initiate the restore operation, such rocking does not cause a shift of the register carriage.

It was previously mentioned that the actual multiplication operation was initiated by the rocking of initiating lever 435 (FIG. 14) which is normally latched in an inoperative position by two latches 442 and 443. The latch 442 is formed as a bellcrank pivotally mounted on the left side control plate by any suitable means, such as pivot stud 505. The rocking of the latch is occasioned by the rocking of the automatic shift and clearing control shaft 220 which has heretofore been explained in Section G above, and which is shown in FIG. 7. On its right end this shaft carries an arm 506 (FIG. 3) pinned thereon or otherwise rigidly secured thereto. A pin 507 on the lower end of this arm engages a slot formed in a link 508 that is resiliently held in contact therewith by a suitable spring 509. The forward end of the link is pivotally mounted on a supporting arm 510 (see also FIG. 5) that is pivotally mounted on the right frame plate by any suitable means, such as stud 511. A second link 512 connects this arm to an arm 513 that is rigidly mounted on the right end of a transverse shaft 514. Thus the rocking of shaft 220 in the first cycle of operation is effective to rock the shaft 514 (clockwise in FIG. 5 and counter-clockwise in FIG. 14).

The left end of the shaft 514 carries a U-shaped lever 515 (FIG. 14) rigidly mounted thereon. A pin 516 mounted on the lower arm of the lever 515 engages the upper edge of the forwardly extending arm of the bellcrank latch 442. Thus the rocking of shaft 514 (counter-clockwise in this figure), rocks the latch 442 clockwise against the force of its spring, not shown. As the shaft 514 is held in its rocked position throughout the multiplication operation, this latch lever is held disabled until the multiplication operation is completed. However, it should be noted that the release of the arm 435 by this latch alone is not sufficient to initiate a multiplication operation, but that latch 443 must also be released.

The latch 443 is released by the operation of the override pawl 235 (FIGS. 7 and 8) and the consequent rocking of bail 244 (FIG. 7) by means of a mechanism which is best illustrated in FIG. 13. The leftward extension 245 of the bail 244 underlies the rearward arm of a bellcrank lever 525 that is rotatably mounted on the shaft 220 adjacent the intermediate frame plate 44. This bellcrank is normally biased to the position shown in this figure by a spring 526 tensioned between its lower arm and an extension on a link 527. The lower arm of this bellcrank carries a pin 528 that normally lies within a slot, not illustrated, in the rearward end of the link 527. The forward end of the link 527 is pivotally mounted on an arm 529 by any suitable means, such as pin 530. The arm 529 is rigidly secured to a short shaft 531 that extends between the intermediate frame plate 44 and the left side control plate 45. The latch 443 is mounted on the left end of the shaft 531, so that it is rocked (counter-clockwise in FIG. 14) by the rocking of shaft 531 which, in turn, is caused by the operation of the override pawl and bail 244 through the medium of the bellcrank 525 and link 527. This assembly is biased to its latching position primarily by the spring 526 shown in FIG. 13. It will be noted that operation of the override pawl and the linkage which controls the positioning latch 443 is operated with each operation of the override pawl. However, such release of latch 443 will not be effective to initiate a multiplication operation unless the latch 442 has heretofore been effected by the rocking of the shift and clearing control shaft which results from a depression of one of the multiplication control keys.

3. MULTIPLICATION CONTROL KEYS

It is customary in the preferred form of machine to provide for three separate multiplication operations which can be selected by the operator. The three operations are: (a) Normal multiplication, which involves repeated addition of the multiplicand standing in the keyboard under the control of the multiplier mechanism herein described, which operation is preceded by a shift of the register carriage 60 to the extreme left-hand position and a clearing of both registers, and which is initiated by a "MULT" key 540 (FIG. 1); (b) an accumulate multiplication operation, which is the same as the first except that the clearing mechanism is disabled, so that one product is added to another, which operation is initiated by the depression of an "ACCUM MULT" key 610; and (c) a complementary multiplication operation to subtract a second product from a first by subtractively operating the accumulator register under control of the multiplier segments, which likewise disables the clearing mechanism, and which is initiated by a "NEG MULT" key 640. These will now be described in order.

(a) *Normal multiplication.*—The multiple key 540 (FIGS. 11 and 13) is mounted on a key stem 541 slidably mounted in aligned apertures in the upper and lower multiply frame plates 395 and 396. It is biased to its upper and inoperative position by a suitable spring 542 and on its forward edge it carries a latching shoulder 543. A roller 544 on the key stem 541 is embraced within a slot 545 formed in the forward end of an angularly shaped lever 546 that is pivoted on the right side of the intermediate frame plate 44 by any suitable means, such as pivot stud 547 (FIG. 11). A downwardly extending projection of the arm 546 carries a roller 548 that engages the forward face of an arm 549 which is rigidly mounted on the initiating shaft 210. Thus, the depression of the multiply key 540 is effective to rock the shaft 210 (clockwise in FIG. 13 and counter-clockwise in FIG. 3), thereby initiating machine operation and conditioning the automatic shifting and clearing mechanisms for operation in the first cycle of operation.

The latching shoulder 543 on the key stem is adapted to engage an ear 555 (FIGS. 11 and 13) formed on the upper end of an arm 556 that is rigidly mounted on a latching shaft 557. This shaft extends between, and is journalled in, the intermediate frame plate 44 and the left side control plate 45. It also carries a latching lever 558 (FIG. 9) which is effective to latch the accumulate multiply and complementary multiply keys in their depressed position. The shaft 557 and the two latching arms 556 and 558 are biased to a latching position by any suitable means, such as a spring 559 which is tensioned between the lower end of lever 558 and a stud, not shown, on the right side of the control plate. The lower end of the lever is engaged by an extension 562 of the lever 407 (see also FIG. 17). The lever 407 rocks in a counter-clockwise direction (if viewed from above) from the force of its spring 408 as the multiplier carriage 398 is permitted to escape to the left. Hence extension 562 normally moves away from the lower end of the arm 558 as multiplier factors are entered into the multiplier carriage 398. As the multiplier carriage is returned to its home position in the course of the multiplication operation, the extension 562 returns toward lever 558 and will barely engage it when the multiplier carriage reaches its home position. It can be mentioned here that the restoring operation is accomplished by an overshift of the multiplier carriage 398 one ordinal space to the right of its home position (in which position it cannot be latched, so that it immediately returns to the home position at the end of that cycle of operation). In this overshifting operation the extension 562 will obviously rock arms 558 and 556 and shaft 557 (clockwise in FIG. 9 and counter-clockwise in FIG. 11).

Associated with, but spaced slightly away from, the multiply key 541 is a roller 570 (FIG. 11) on the rearward end of the right leg 571 of a bail 572 that is rotatably mounted on the transverse shaft 514. The left leg 574 of the bail 572 supports the forward end of a rearwardly extending link 575 (see also FIG. 9). Originally the link 575 extended to adjacent the rear of the machine but more recently it has been found advisable to support the link 575 at an intermediate point by means of an arm 576 pivotally mounted on the shaft 421.

The rear end of the link 575 is connected to a bellcrank 577 (see also FIG. 14) that is pivoted on the left side control plate 45 by any suitable means, such as stud 578. The bellcrank is resiliently rocked to the clockwise position shown in this figure by a suitable spring 579 tensioned between the forwardly extending arm of the bellcrank and a stud on the frame plate. The forwardly extending arm of the bellcrank 577 supports the lower end of a link 580, the upper end of which is pivotally connected to an additive control arm 581. The forward end of the arm 581 is pivotally mounted on the framing by means not shown herein, and its rear end is biased downwardly by a spring 582 tensioned between a seat on its rear end and a seat provided in an additive digitation control arm 583 (FIG. 9). A roller 589 on the rear end of the additive control arm 581 overlies the upper edge of the additive digitation control arm 583, so that when the arm 581 is in its normal position, the digitation control arm 583 is positively depressed by the roller 589. However, as the arm 581 is rocked upwardly by the linkage herein described, it resiliently lifts the digitation control arm 583.

The additive control arm 583 is biased upwardly by the spring 582 tensioned between it and arm 581. The forward end of the arm 583 is pivotally secured to the cam follower bellcrank 584 (to be described in the next paragraph) by any suitable means, such as pivot stud 585. The rear end of the arm 583 is formed as a shoulder 586 adapted to engage a pin 587 secured to the upper end of a digitation setting lever 588 which is pinned to, or otherwise rigidly secured on, the digitation shaft 122. It is obvious that the bias of spring 582 normally would lift the shoulder 586 into engagement with pin 587, but this is prevented by roller 589 which engages the upper edge of the lever 583—the roller 589 being held in the disabling position through the linkage including the bellcrank 577, link 580 and arm 581 (FIG. 14). However, when the multiply key 540 is depressed, the linkage lifts the arm 581, whereupon roller 589 releases arm 583 and spring 582 will lift it into engagement with the pin 587 on the digitation setting lever 588.

It has already been mentioned that the front end of lever 583 is pivotally mounted on the upper arm of a bellcrank cam follower 584. The follower bellcrank 584 is pivotally mounted in the machine by any suitable means, such as the shaft 594, the ends of which are supported in the frame plates 45 and 46. At its upper end the bellcrank carries a roller 595 which engages the periphery of a cam 596 mounted on the main drive shaft 114. The lobe of the cam 596 is so positioned that the cam rocks the follower bellcrank 584 at the start of a cycle of operation, thereby pushing the setting link 583 rearwardly and thus rocking the lever 588 and digitation control shaft 122 (counter-clockwise in FIG. 9) to the additive position. The bellcrank 584 is latched in this operative position by means of a square stud 597 which is engaged by a latch arm 598 when the bellcrank follower is rocked to its operative position. The latch arm 598 carries a forwardly extending arm 599, the upper edge of which is engaged by the offset portion of the arm 471 when that arm is released by its latch 468. Thus the cam follower arm is rocked to its effective position at the start of the cycle of operation, is latched in that position throughout that ordinal series of operations, and is released when the ordinal series is terminated by the unlatching of arm 471. Thereupon a centralizer, not shown but conventional in this type of machine, returns the shaft 594 to the neutral position shown.

It should be mentioned at this point that a roller 477 (FIG. 9) on the rear end of the shift control lever 455 engages the upper edge of the setting arm 583 when the shift control lever is rocked by the return of a multiplier segment to its "0" position. Thus the rocking of the lever 455, to initiate the interordinal program in the multiplication operation, is effective to immediately disable the digitation control that is effected by the additive setting link 583.

(b) *Accumulative multiplication.*—The accumulate multiply key 610 is mounted on a key stem 611 (FIG. 14) that is mounted in the multiplier keyboard frame in much the same manner as the multiply key 540 (FIG. 13). A pin 612 on the lower end of the key stem is embraced within a slot 613 formed in the forward end of a control lever 614. This lever, as is customary, lies outside of the left-hand control plate 45 in the forward part of the machine, and then is offset to the right through an aperture in the frame plate, and is pivoted on a shaft 615. The rear end of this lever is bent downwardly to carry a pin 616 that lies within a slot 617 formed in the rear end of the additive control arm 581. It is apparent that the depression of the accumulate multiply key 610 lifts the additive control arm 581, and hence controls the sign character of the multiplying operation in the same manner as if the normal multiply key 540 had been depressed. It follows that the series of multiplication operations and the control of digitation thereby is the same in both instances.

An interponent lever 620 (FIG. 14) lies immediately to the left of the accumulate control lever 614, and, incidentally, is also rotatably mounted on the shaft 615. This interponent arm 620 carries a pin at its forward end (not shown herein but well-known in the "Friden" machine) which underlies the forward portion of the lever 614. Hence the lever 620 will be rocked (clockwise in this figure) from the depression of the accumulative multiply key 610. The interponent lever 620 carries a downwardly extending projection 622, the lower end of which rests against a pin 623 carried by an arm 624 rigidly secured on the left end of the motor-initiating shaft 210. It is apparent that the depression of the key 610 will rock the shaft 210 (counter-clockwise in the figure) to initiate operation of the motor, cause engagement of the clutch, and condition the automatic left shift and clear mechanism (described in Section G) for operation.

The interponent arm 620 also carries a pin 625 that lies within a slot formed in the upper end of a link 626. The lower end of the link 626 is pivotally connected to an arm 627 that is rigidly mounted on a shaft 628. The shaft 628 is, therefore, rocked (counter-clockwise in FIG. 14 and clockwise in FIG. 13) whenever interponent lever 620 is operated. On its right end, the shaft 628 carries an arm 629 rigidly secured thereto. A pin 630 on the upper end of this arm engages the upper edge of the forward arm of a rocker 631 which is pivotally mounted on the transverse shaft 220. A leftwardly extending ear 632 on the rear arm of rocker 631 underlies the clear clutch pusher link 227. It is apparent that the rocking of the interponent lever 620 from depression of key 610, rocks shaft 628 (clockwise in FIG. 13), and thereby rocks the rocker 631 to lift the clear clutch controlling pusher 227 from engagement with the clutch control bar 188. The key 610 is, of course, latched in its operative, or depressed, position, and holds the pusher link disengaged throughout the operation. The depression of the accumulate key 610, through the rocking of arm 614 and the interponent arm 620, is effective to rock shaft 210 to initiate a machine operation, which includes shifting of the carriage to the extreme left-hand position, and simultaneously disables the clear clutch control mechanism, so that clearing is impossible. Thus, in this operation the true, or positive, product is secured which will be added to values theretofore standing in the registers, as the registers are not cleared by the operation initiated by key 610.

(c) *Subtractive multiplication.*—Subtractive, or complementary, multiplication is secured by the depression of the negative multiply key 640 (FIGS. 1 and 14). This key is mounted on a key stem 641, similar in construction and mounting to the key stem 541 of the normal multiply key 540 or the stem 611 for the accumulative multiply key 610. This key stem at its lower end carries a pin 642 which is engaged within a slot 643 formed in the front end of a negative control arm 644. This lever is similar in shape to that of the accumulative multiply control lever 620 and lies immediately adjacent to it. It is also pivoted on the shaft 615 and has a downwardly extending rear end of the same outline as that of the accumulative control lever. This negative control lever 644 carries a roller, not shown, adjacent its rear end, which roller overlies the upper edge of a negative control link 646 (FIG. 9). This negative control link 646 is pivotally mounted on the pivot 585, and lies immediately to the right of the additive control link 583. It is formed with an upper extension 647 (FIG. 9) which engages the roller 477 carried by the shift control lever 455. It is obvious that the negative control link 646 is held depressed (along with positive control link 583) by the roller on arm 455 when the machine is not operating in multiplication, or during multiplication when the operative multiplier segment 399 returns to the "0" position to initiate a shifting operation. The link 646 also has a downwardly and rearwardly extending projection 648 which is provided with a shoulder 649 adapted to engage a pin 650 on the lower end of the lever 588. Thus, when the negative multiply key 640 is depressed, the negative control link 646 is enabled to rise, so that the shoulder 649 engages the pin 650 to condition the machine for subtractive digitation. Thereafter, upon the rocking of the bellcrank follower 584, the lever 588 and shaft 122 are rocked (clockwise in FIG. 9) to control the machine for subtractive operation.

The depression of the negative multiply key 640 and the rocking of the substractive control lever 644 (clockwise in FIG. 14) is also effective to rock the interponent lever 620, as the pin on the forward end of that lever extends to the right sufficiently to underlie the lever 644 also. Thus, the depression of the negative multiply key 640 is effective to initiate a machine operation and to disable the clearing mechanism, so that the carriage is shifted to the extreme lefthand position and multiplication initiated in a subtractive direction, without clearing of the registers.

4. MULTIPLICATION RESTORE

It has been mentioned that as the operative one of the multiplier segments 399 returns to its "0" position (shown in FIGS. 9 and 11), the consequent rocking of the shift control lever 455 is effective to initiate two shifting operations, in one of which the register carriage 60 is shifted one order to the right and in the other of which the multiplier carriage 398 is shifted one order to the right. It is customary in the machine with which this invention is associated, as described in the Friden multiplier Patents Nos. 2,371,752 and 2,399,917, previously mentioned, to restore the projected pin 401 of that order to its inoperative position. In the past it has been most convenient to secure this restoration by means of apertures 413 (FIG. 9) in the lower end of the value pins 401, which apertures are engaged by cam-shaped teeth (not shown but fully described in said patents) which project into these apertures when the operative one of the multiplier segments 399 is shifted one order to the right and the cam thereon becomes effective to retract the pins in the second shifting cycle. Thus, as multiplication progresses the pins 401 are retracted, allowing the associated segment 399 to release to the "9" position. However, as the released segment lies two orders to the right of the one controlling the multiplication operation at that time, this release of the segment is incapable of controlling operation of the machine. When the multiplier carriage is completely shifted to the right, means is provided for returning all of the released sectors 399 to their "0" positions and to again latch them on the respective "0" latches 400.

The means for so restoring the multiplier sectors is shown in FIG. 11. An arm 660 is mounted on the right end of the shaft 409 which carries the various segments. This arm carries a long pin, or bail, 661 which is adapted to engage one of the spokes of each of the multiplier segments 399. The lower portion of the arm 660 is formed as a gear segment 662, which segment is constantly meshing with a gear 663. The gear 663 is rotatably mounted on the right frame plate 403 of the multiplier carriage 398 by any suitable means, such as pivot stud 664. A second gear segment 665 meshes with the idler 663, which segment is also pivotally mounted on the frame plate by any suitable means, such as pivot stud 666. A roller 667 on the segment 665 is adapted to be engaged by a snail cam 668 which is mounted on the constantly rotating auxiliary drive shaft 214. This cam 668 is located on this shaft to engage the roller 667 when the multiplier carriage 398 is shifted one order to the right of its home position, or two orders to the right of the operative position of the highest order segment 399 in which it is aligned with feed pawl 423. The respective segments rotate (counter-clockwise in FIG. 9 and clockwise in FIG. 11) upon the insertion of values into the multiplier unit. As indicated above, these segments automatically rotate to the "9" position in the second shift following their return to the "0" position. Thus, the segments in FIG. 11, at the time of restoration, will be lying clockwise from the position shown, actually with the leading spoke practically in engagement with the bail 661. In the overshifting of the carriage, the cam 668 engages roller 667, rocking the two gear segments and the idler, and thereby rotating arm 660. This arm 660 is rocked, first in a counter-clockwise direction, and then is enabled to return to the home position shown. When the bail 661 rocks to the extreme counter-clockwise position, it has restored all of the segments 399 to a "0" position and enables all of them to be relatched upon the respective "0" latches 400 (shown in FIG. 9).

The second, or overshifting, operation following the return of the highest order segment 399 to its "0" position is caused by an ear 414 (FIG. 9) carried on the left end plate 403 of the multiplier carriage 398, which ear 414 engages the ear 456 on the shift control lever 455 and holds it in a shift-initiating position. Thus, as the highest order segment 408 returns to its "0" position, the upper end of this segment rocks the lever 455 to initiate a shift operation, which operation shifts the multiplier carriage 398 one order to the right (but which does not shift the register carriage 60 as has heretofore been explained). Thereupon the ear 414 causes a second shift, which is the overshift that operates the restore mechanism. It has already been mentioned that this overshift also is normally effective to release the depressed multiplier key by releasing the latches 556 or 558, as the case may be.

I. REPEAT MULTIPLICATION OPERATION

For many years the machine with which my invention is preferably associated has contained a "Repeat Multiplication" mechanism. This term is used to mean one in which a multiplier factor can be inserted in the multiplier value keys 393, 394 and the machine then conditioned for an unlimited repetition of multiplication operations using the same multiplier factor. For the most part the mechanism is essentially that described in the patent to Friden et al., No. 2,376,997 of May 29, 1945. This mechanism contains three major elements: (1) means, including a "Repeat" key, for conditioning the machine for repetitive multiplication operations; (2) means for locking the multiplier value in the multiplier control segments 399; and (3) means for returning the multiplier carriage 398 to the proper ordinal position. These elements will now be briefly described in sequence.

1. REPEAT KEY

A repeat key 690 (FIG. 1) is mounted on a slide 676 (FIG. 9) that is slidably mounted in brackets on the multiplier top frame plate 395. A spring 677 resiliently biases the slide 676 to its rearward, or inoperative, position. This slide is provided with a customary detent and centralizer, not shown, which latches the slide 676 in either its rearward, inoperative, position or in its forward, repeat operation, position, while the spring 677 biases it to the former position whenever it reaches a mid-point between the two. A pin 675 carried by the slide 676 is embraced within a diagonal slot 679 formed in a lever 680 that is pivotally mounted on the multiplier upper frame plate 395 by any suitable means, such as a pin 681. As is seen in FIG. 9, the pulling of the key 690 and key stem member 676 forwardly from the inoperative positive shown, results in rocking of the arm 680 (counter-clockwise in this figure). A nose on the rear end of the arm 680 engages an ear 682 formed on the rearwardly extending leg of a bellcrank 683 that is pivoted at its elbow, as by pin 684 carried by a bracket extending from the lower multiplier frame plate 396. A slot in the other leg of the bellcrank 683 engages a pin 685 carried by the upwardly extending arm of a latching bellcrank lever 686 that is pivoted at its elbow on a stud 687 extending to the right from the left side control plate 45. Thus the forward translation of the key 690 (to the right in FIG. 9) is effective to rock the latching bellcrank 686 (clockwise in this figure), which rocking is effective to control the resetting of the multiplier segments 399 in the selected position and to determine the extent of escapement of the multiplier carriage 398.

2. RESETTING MULTIPLIER SEGMENTS

A long longitudinally extending link 693 (see also FIG. 17) is connected at its front end to the upwardly extending arm of the latching bellcrank 686 by any suitable means, such as a pin 694, and at its rear end to a two-armed lever 695, as by a pin 696. The lever 695 is pivotally mounted on the auxiliary frame plate 46, as by screw stud 697. A spring 698 biases the lever 695 to an inoperative position (in a clockwise direction in FIG. 9) and pulls the link 693 toward the rear, and hence rocks the bellcranks 686 and 683 to the position shown in this figure. A pin 699 carried by the upper end of the lever 695 extends through an aperture in the auxiliary frame plate, the right end of which pin is embraced within a slot formed in the rear end of a bellcrank 700 which is rigidly secured to a sleeve 701 (FIG. 17) that is rotatably mounted on a short shaft 702 (FIG. 9) extending between the intermediate frame plate 44 and the auxiliary frame plate 46. An arm on the right end of the sleeve 701 lies in the same angular position as the forwardly extending arm of the bellcrank 700 and the two support a transverse rod, or bail, 703. The rod, or bail, 703 is embraced within a slot formed in the upwardly extending end of an arm 704 that forms the right end of a bail 705 pivotally mounted in the multiplier carriage 398 by any suitable means, such as on a tie rod 706. The bail 704 is provided with a latching flange 707 as shown.

Each of the multiplier segments 399 carries a repeat latching plate 710, which actually, but not shown in these drawings, is pivotally mounted on the hub of the associated segment. Each latching disk is resiliently held in a retracted position with respect to its coordinal segment 399 by a light spring 711 that is tensioned between an ear 712 carried by a spoke of the coordinal segment 399 and a spring seat formed in the latching disk. As a segment rocks to a value position (counter-clockwise in FIG. 9), the ear 712 positively forces the latching disk 710 in the same direction and through the same angular increment. The latching disk is provided with a series of latching teeth 713, the interdental spaces between which are adapted to be engaged by the latching ear 707 carried by the bail 705. It is apparent that the operation of the repeat key is effective to rock the bail 705, whereby its ear 707 engages an interdental space between the teeth 713 of latching segment 710 and thereby latches the latching disk 710 in the adjusted position. Thereafter, during the coordinal digitation operations of the machine in multiplication, the segment can be returned to its "0" position in the normal manner, but the latching segments 710 remain in the adjusted position. During the restore cycle the segments are returned to their "0" positions by the restore bail 661. However, at that time, the "0" latches 400 are disabled, so that the segments are immediately released to rock toward an extreme value position by virtue of the power stored in their springs 410, but are stopped in the selected position by the engagement of the ear 712 on the segment 399 engaging the corresponding shoulder formed on its disk 710.

The "0" latches 400 are controlled by a bail 720 (FIG. 9), the legs of which are pivotally mounted on the transverse shaft 210. The bail 720 lies immediately behind the lower end of the "0" latches 400, so that rocking of the bail (clockwise in this figure) rocks all of the "0" latches 400 to their disengaging positions. A pin 721 on the left leg of the bail is embraced within an aperture formed in the lower end of a link 722 (FIG. 14), the upper end of which is pivotally connected to a second link 723 by any suitable means, such as a pin 724. The second link 723 is pivotally and slidably mounted on the left-hand control plate 45 by any suitable means, such as by a slot 725 in the upper end of the link embracing a pin 726 riveted to the left side control plate 45. The angular position of the lower end of the link 723 is controlled by a link 727, the forward end of which is mounted on the pin 694 (FIG. 9) carried by the upper arm of the bellcrank 686. Thus the rocking of the bellcrank 686 to its operative position (clockwise from that shown in this figure) pulls the link 727 forwardly; and the return of the parts to their normal condition pushes this link rearwardly to position link 723 in its inoperative position shown.

The rear end of the link 727 extends through an aperture in the control plate 45, and at its rear end carries a pin 728 which is embraced within a slot 729 formed in a projection on the lower end of the link 723 (FIG. 14). A small light spring 733 resiliently biases the link 723 to follow the position of link 727. A shoulder 730 on the lower end of link 723 is adapted to engage a square pin 731 riveted to, or otherwise rigidly secured on, the multiplier initiating lever 435. It is obvious that as this lever is returned to its latched and inoperative position during the restore cycle, the pin 731, through its engagement with shoulder 730, lifts the link 723, when this link has been positioned forwardly so that the shoulder overlies the pin. The upper end of the link 723 underlies an escapement control lever 732, so that when the link 723 is lifted, the arm 732 is rocked to release the escapement mechanism and permits the multiplier carriage 398 to escape toward its extreme left-hand position. Simultaneously the lifting of link 723, through link 722 and pin 721, rocks the bail 720 (clockwise in FIGS. 9 and 14) to release the "0" latches 400. Thereupon all of the segments are released to return to the position determined by the latching disks 710.

3. CARRIAGE ESCAPEMENT CONTROL

The bellcrank 686 (FIG. 9), when positioned by manipulation of the repeat key 690, is effective to determine the escapement of the multiplier carriage 398. This is secured by means of a nose 737 formed on the forwardly extending arm of the bellcrank 686, which nose is adapted to engage the interdental spaces between teeth 738 formed on a rack member 739 (see also FIG. 17). The rack member, as is conventional in the machine with which my invention is associated, is pivotally mounted on the leftwardly extending arm 415 of the bellcrank 407. The forward edge of the arm 415 normally engages a pin 740 carried by an arm 741 slidably but nonrotatably mounted on the rack 739, so that the rocking of the bellcrank 407 (counter-clockwise when viewed from above, or rightward movement of the arm 415 when viewed from the left as in FIG. 9), positively positions the rack 739. Normally a light spring 742 (FIG. 17) retracts the rack 739 whenever the bellcrank 407 is returned to its home position. However, when the repeat key 690 is operated to rock the bellcrank 686 (clockwise in FIG. 9) so that the nose 737 thereof engages one of the interdental spaces in the rack, the rack member 739 is locked in that position. Thereafter the bellcrank 407 is rocked away from it as the multiplier carriage 398 is moved toward its home position in each interordinal program. In the restore cycle of the machine, the escapement latch lever 732 (FIG. 14) is operated to release the escapement mechanism, whereby the carriage 398 moves to the left under the force of spring 408 until the arm 415 of the bellcrank 407 engages the pin 740. This pin and its rack 739 are, of course, locked in the position determined by the position of the carriage at the time the repeat key was operated. Thus at the end of the restore cycle, when the repeat mechanism is conditioned for operation, the multiplier carriage 398 is returned to its proper position and the multiplier segments 399 are released to return to the position determined by the latching disks 710. Thus the value originally set in the multipler unit is automatically reset therein.

It can be noted here that it is customary in the machine of the patents above-mentioned to provide an interlock which prevents adjustment of the repeat multiply key during a multiplication operation. The usual mechanism for this purpose comprises a rocker 750 (FIGS. 14, 15 and 16) that is pivotally mounted on the left-hand control plate by any suitable means, such as a pivot stud 751. The upper end of the rocker is slotted, as at 752 (FIG. 14), to embrace a long pin 752 carried by slide 676. The lower end of the rocker is provided with a laterally extending ear 754. This ear 754 cooperates with a pin 518 on the rear end of the upper arm of U-shaped lever 515 when that lever is rocked to its operative position at the start of a multiplication operation (clockwise in FIGS. 14, 15 and 16). In the operative position of lever 515 the pin 518 will lie either in front of or behind the ear 754, thereby preventing rocking of the lever 750 and the adjustment of the repeat key 690 until the multiplication operation has been completed.

It can be mentioned that in this preferred form of repeat multiplication mechanism, certain interlocks are provided which are not pertinent to the present invention but which prevent the operation of the value keys 393, 394 after the repeat key 690 has been moved to its forward or repeat condition.

II. SPLIT-MULTIPLICATION MECHANISM

The primary purpose of the present invention is to provide a mechanism which, in effect, enlarges the capacity of the customary ten-order keyboard, twenty-order register machine in split-multiplication work to a maximum of two five-digit multiplicands multiplied by a single five-digit multiplier without intermingling the products. In my invention I set the first multiplicand factor into the right five orders of the main keyboard and then set the multiplier factor (a maximum of five digits) in the multiplier keyboard 393, 394. Thereafter the depression of one of the multiplier control keys, such as 540 or 610, causes the machine to perform a first multiplication operation in which the result is registered in the right-hand ten orders of the twenty-order register.

After the first phase of the split-multiplication, the right-hand side of the keyboard keys 80 is preferably automatically cleared by the "add" key mechanism, so that the second multiplicand factor can then be inserted in the left-hand side, or highest five orders of the main keyboard. The multiplication operation which follows depression of one of the multiplier control keys will consequently be registered in the eleventh to twentieth dials of the main register, so that the two products are not intermingled. In view of the fact that five "0's" have been added to the multiplier factor by enabling it to escape the additional five orders to the left, it is obvious that following the initial program of shifting the carriage to the extreme left-hand position, the register carriage 60 will be shifted five orders to the right before the multiplication actually begins. As the multiplicand factor is in the left-hand side of the main keyboard, it is apparent that the units digit of the product will be registered in the eleventh order dial and the other product values will be registered to the left thereof in sequence.

Preferably, the conditioning of the machine for split operation will have set the "add" key mechanism to its operative position, so that upon the termination of the first phase of this, the multiplication operation, the right-hand side of the main keyboard is automatically cleared. Also, in the preferred form of my mechanism, the conditioning of the machine for split operation will have conditioned for operation a mechanism which will be effective upon the initiation of the multiplication operation to set the repeat mechanism (controlled by key 690) to its operative position. Simultaneously therewith, the repeat mechanism is modified so that when the multiplier carriage is allowed to escape to the left at the end of the first phase multiplication operation, it is allowed to escape five orders more than the original setting—in effect, adding five "0's" to the previous multiplier factor. Finally, the conditioning of the machine for split operation will preferably condition a repeat restore mechanism for operation during the second phase of the split operation, so that the repeat multiply mechanism will be restored to its nonrepeat position at the end of the operation and the machine is freed for a subsequent split-multiplication operation.

It is important to note that, without changing the usual programming of the multiplication operations, it is possible to accumulate the second product automatically in the left side of the register dials 61 and the two products have been accumulated separately in the parts of the register. By this means it is possible, in a ten-order keyboard and twenty-order register machine, to accumulate two separate and distinct products resulting from the multiplication of two separate five-digit multiplicands and a five-digit multiplier. The mechanism by means of which this result is accomplished will now be explained in detail.

In my preferred embodiment the split-multiplication mechanism of my invention is selectively operable by the operator. It will be understood that, if desired, a machine could be designed following the teachings of this invention which would invariably operate to perform split-multiplication but such a machine would lose the value now inherent in the usual multiplication machine. Hence, it is preferred that the machine of the present invention be operable in the conventional manner, i.e., to multiply a ten-digit multiplicand by a ten-digit multiplier, as well as to perform split-multiplication. The invention, therefore, will be described in connection with the embodiment which enables the operator to determine whether the operation shall be normal multiplication or split.

A. Conditioning key

The mechanism for conditioning the machine for the usual multiplication operation or for split-multiplying operations is preferably controlled by means of a lever 801 at the right side of the machine (see FIG. 1). In the preferred form of my machine, this key, or lever, is rigidly mounted on the right end of a shaft 802 journalled in the right frame plate 42 (FIGS. 3, 5 and 6) and the left side control plate 45 (FIGS. 15, 16 and 17). This key, as shown in FIGS. 3, 5 and 6, is formed as a lever which is held in either of two adjusted positions by means of a latch 803. The latch 803 is preferably formed as a bellcrank pivotally mounted at its elbow, as by means of screw stud 804 threaded into the right side control plate 54. The latch is provided with a latching notch 805 and a second notch, or shoulder, 806 as shown. These notches are adapted to engage a long pin 807 carried by the lever 801—the latch 803 being biased into such engagement by a suitable spring 808 tensioned between the other arm of the bellcrank and a suitable stud on the right side control plate 54. It is obvious that the latch 803 will lock the lever 801 in either the forward position shown (which is the position for controlling a split-multiplication operation), or in a rearward position (clockwise from that shown in FIG. 6), in which case the split-multiplication mechanism of this invention is disabled and the machine is conditioned for conventional operation. Preferably the latch is so formed that it forms a positive lock against manipulation of the lever 801 unless the machine registers are cleared by operation of the register clearing key 809 (see also FIG. 1) of usual construction. This positive locking is preferred in order to avoid accidental manipulation of the lever 801. Normally if the operator desires to change from one type of multiplication to the other, he will first want to clear the register in any event, so that it is preferred that such clearing be made a prerequisite to the adjustment of this key. The release of the latch 803 by the depression of the register clearing key 809 is readily accomplished by means of a pin 810 carried by the latching arm 803, which pin will be engaged by the key-top 809 as the key reaches the bottom of its stroke (so that the clearing operation will have been initiated before the latch is released). At this time the lever 801 can be adjusted to the other operative position.

The movement of the lever 801 to its split-multiplication position shown in FIGS. 3, 5 and 6 is effective to pull the "add" key to its operative position. This is readily secured by means of a link 815, the front end of which is mounted on the pin 807. The rear end of the link (as shown in FIG. 5) is provided with a slot 816 which embraces a pin 817 on the "add" key. Thus the "add" key can be adjusted for other operations without effecting the control of the split-multiplication mechanism, but whenever the machine is conditioned for split-multiplication, the "add" key mechanism is effective to clear the keyboard upon the termination of a multiplication operation. This prevents the operator from neglecting to clear the right half of the keyboard at the end of the first phase of multiplication and consequently effecting a misoperation of the machine. It is obvious that this operation of the "add" key mechanism is not essential to a split-multiplication operation but is highly desirable in order to prevent misoperation.

The left end of the shaft 802 (as shown in FIGS. 15, 16 and 17) carries a bellcrank 825. The two arms 826 and 827 of the bellcrank are set at roughly an angle of 90° to each other, and are offset slightly from one another. Obviously the two legs of this bellcrank could be individual arms, each rigidly affixed to the shaft 802, but a single bellcrank with offset legs is preferred. The vertical arm 826 of the bellcrank 825 supports the front end of a link 828, the two members being pivotally connected to each other by means of a pivot pin 829. The rear end of this link 828 is pivotally connected to a blocking arm 830 by any suitable means, such as a pin 831. The blocking arm 830 is pivotally mounted on the left side control plate by any suitable means, such as a screw stud 832, and at its upper end carries a pin 833 adapted to engage and block operation of a repeat restoring bellcrank 941, to be described hereafter in Section D. In FIGS. 15 and 16 the mechanism is shown in the position in which it lies when conditioned for a split-multiplication operation, in which event the blocking arm 830 is rocked clockwise from the control bellcrank and the pin 833, therefore, does not engage it. However, if the setting key 801 is moved to its rearward, or normal multiplication, position, the blocking arm 830 is rocked counter-clockwise from the position shown in these two figures and the pin 833 thereupon engages the arcuate lower edge of the control bellcrank 941 and blocks its operation.

The second arm 827 of the bellcrank 825 extends rearwardly from the shaft 802. At its rear end it supports a control link 840, the link being pivotally mounted on the rear end of the arm 827 by any suitable means, such as pin 841. The lower end of the link 840 is provided with a long slot 842 which embraces a pin 875, carried by an operating link 871 to be described shortly. A spring 843 is tensioned between the two pins 841 and 875, thereby resiliently biasing the link 871 to an upper and operative position. However, when the control key 801 is in the rearward, or normal multiplication, position, the shaft 802, and consequently the bellcrank 825, are rocked (counter-clockwise in FIGS. 15 and 16). In that event the link 840 is operative to depress the forward end of the operating link 871 and thereby render the split-multiplication mechanism ineffective.

B. Split-multiplication controls

The split-multiplication controls of the preferred form of my machine are shown particularly in FIGS. 15 and 16. FIG. 15 shows these controls latched in an inoperative position which is representative of the position of the parts when the split-multiply key 801 is in its forward, or split-multiply, position, i.e., the machine is conditioned for split operation, but prior to the depression of a multiplication key. In contrast, FIG. 16 shows the position of the parts after the depression of a multiplication control key, such as key 540 (FIG. 1) or the accumulate multiply key 610.

This mechanism is operated by cam 850 (shown in its full-cycle, or "0," position in FIGS. 15 and 16). This cam is mounted on the extreme left end of the main power shaft 114, and hence rotates with each cycle of machine operation. A cam follower arm 851 is associated with the cam 850, the cam follower being pivotally mounted on a pivot stud 852. A roller 853 is mounted on the follower arm 851 in a position to engage the periphery of the cam 850. A relatively strong spring 854, tensioned between a stud on the arm 851 and another on the frame plate, biases the follower arm toward the cam 850, so that the roller 853 will normally be biased into engagement with the periphery of the cam.

In all operations except multiplication the follower arm 851 is latched in the clockwise position shown in FIG. 15 by means of a latch arm 860, a shoulder 861 on the forward end of which engages a pin 855 on the lower end of the arm 851. This latch 860 is pivotally mounted on the adjacent control plate 45 by any suitable means, such as pivot stud 862. A link 863 connects the rear end of the latch 860 to a pin 864 secured to the additive control link 580 (see also FIG. 14). A spring 865, tensioned between a stud on link 863 and the framing, biases links 863 and 580 downwardly and hence resiliently rocks the latch 860 to its latching position. It will be recalled that the link 580 is lifted in all additive multiplication operations, as it is lifted by depression of either key 540 (FIG. 1) or 610. Thus, in either of these operations, the link 863 is effective to rock the latch arm 860 (clockwise in FIGS. 15 and 16) and thereby release pin 855. At this time the spring 854 pulls the arm 851 forwardly (counter-clockwise from the position shown in FIG. 15 to that shown in FIG. 16) to cause its roller to engage the periphery of cam 850.

It can be noted at this point that customarily the first phase of operation in split-multiplication will be an additive one in order to accumulate a true product. While subtractive multiplication is sometimes used in a split-multiplication operation, it is always in connection with the second phase. In those instances in which the operator is securing individual products on the right side of the machine register and is securing totals of such products on the left side thereof, he may want to subtract in the second phase but never in the first as he will want a true product on the right side. Thus, it is not important to have the split-multiplication operation operated by the subtractive multiply key 640 in the first phase of operation. If it were, it would be relatively simple to rock latch 860 by the operation of the subtractive control arm 644 also.

The release of the follower arm 851 to engagement with the cam 850 conditions for operation two mechanisms which are important in setting the machine for a split-multiplication operation. These mechanisms are: (1) A means for setting the repeat mechanism to its operative position during the first machine cycle (which is the cycle which is effective to condition the shifting and clearing mechanism for the operations preliminary to the initiation of a multiplication operation); and (2) set a control for modifying the carriage escapement at the end of the first phase of the split-multiplication operation. These two mechanisms will now be discussed in that sequence.

1. SET REPEAT MECHANISM

The rear end of a link 870 is pivotally mounted on the pin 855 (FIGS. 15 and 16). The forward end of the link 870 is pivotally mounted on a repeat setting link 871 by any suitable means, such as a pin 872. The rear end of the setting link 871 is slotted, as at 873, to embrace a pin 874 mounted on the left side control plate 45. It is obvious that this link 871 can move longitudinally with respect to the pin 874 and also rock around the pin as a pivot. The forward end of the setting link 871 carries the pin 875 which is embraced within the slot 842 of link 840, as previously noted. The spring 843, which is tensioned between pins 875 and 841, consequently biases the front end of the setting link 871 upwardly, and thereby positions it in its upper, or operative, position whenever the split-multiplication control is set for split-multiplication, as indicated by the parts shown in these figures.

The link 871 carries a bracket 876 extending to the right and upwardly therefrom. The rear edge of this bracket is adapted to engage a pin 755 mounted on the lower end of the repeat latching arm 750. When the repeat key 690 is in its rearward, or nonrepeat, position (as it is in FIGS. 15 and 16) the setting lever will be rocked to the counter-clockwise position shown. In that condition, the pin 755 will overlie the top of bracket 876 so long as the link 871 is in its rearward position. It will be obvious, from a consideration of FIGS. 15 and 16, that immediately upon the depression of the multiplier control key the latch 860 is rocked to its releasing position and consequently the arm 851 will rock forwardly (counter-clockwise in these figures) at that time. Such rocking of the cam follower arm 851 moves the link 871 forwardly, whereupon the forward end of link 871 is raised by spring 843, and bracket 876 thus lies in front of pin 755. The link will be returned rapidly in the first quarter of a cycle of operation, which return of the link 871 rocks the repeat latching lever 750 (clockwise in these figures), pulling repeat key 690 forwardly and setting the repeat mechanism to its operative position. The machine is, therefore, automatically set for a repeat-multiplication operation.

The shape of the cam is such as to hold the link 871 in its rearward position for approximately half a cycle, or until about the third quarter of this initiatory cycle. By that time the customary repeat latch will have been set to latch the repeat setting lever in its adjusted position, and the link 871 can thereupon be disabled. It will be recalled from the description of the multiplier operation in Section H (2) above that the shaft 514 and consequently the U-shaped lever 515 are rocked (counter-clockwise in these figures) at approximately the mid-point of the initiatory cycle.

The upper arm of the lever 515 also carries a pin 517 extending to the left therefrom. This pin is adapted to engage a latching shoulder 877 formed in the forward upper corner of a bracket 878, also formed on the link 871. When the link 871 is in the forward position shown in FIG. 16, the pin 517 overlies the upper edge of the bracket 878. Consequently the rocking of the U-shaped lever 515 (counter-clockwise in these figures) will depress the forward end of the link 871. When the link is completely retracted by the operation of cam 850, the pin 517 will latch in front of the shoulder 877 and thereby latch the link 871 in its rearward position. Incidentally, this position will be maintained throughout the first phase of the multiplication operation as the U-lever 515 is not permitted to rise until the restore cycle of a multiplication operation. This latching of the link 871 to link 870 holds the cam follower arm 851 inoperative, even though the latch 860 is disabled.

It should be noted here that when the machine is conditioned for normal multiplication, the link 871 is locked against operation and consequently the cam follower 851 is held in the ineffective, or disabled, position shown in FIG. 15. It will be recalled that in this situation the split-multiplication control lever 801 is in its rearward position (to the rear of that shown in FIG. 1 and clockwise from that shown in FIGS. 5 and 6). In this situation the shaft 802 is rocked to its disabled position (counter-clockwise from that shown in FIGS. 15 and 16.) In that condition, the link 840 is dropped and its front edge will lie behind a pin 970 carried by a bracket 971 affixed to the base plate 41 (see FIGS. 14 and 15). It is obvious that when the shaft 802 is rocked counter-clockwise from the position shown in FIGS. 15 and 16, the link 840 will not be permitted to rock because of the engagement of its front edge with the pin 970. Thus the link 871 is blocked from forward movement, and consequently link 870 holds the cam follower 851 in the inoperative position shown in FIG. 15. By this means the split-multiplication control mechanism is held disabled so long as the machine is conditioned for normal multiplication.

It should be remembered that in normal multiplication operations, the pin 755 on the lower end of the setting rocker 750 will engage the upper edge of the bracket 876 and hold the link 871 inoperative. It should also be recalled that the upper arm of the U-lever 515, at its extreme rear end, carries a pin 518 which is adapted to cooperate with a leftwardly extending ear 754 at the extreme lower end of the setting lever. As the lever 515 is rocked (counter-clockwise in FIGS. 14, 15 and 16) at about the mid-point of the initiatory cycle, the pin 518 will pass either in front of or behind the ear, thereby locking the arm, an consequently the repeat multiplication mechanism, in either of its adjusted positions. In the first phase of a split-multiplication operation the repeat mechanism has already been set to its repeat position prior to the operation of lever 515, so, in that event, the pin 518 serves as a latch to hold the repeat mechanism in its adjusted position throughout the first phase of the split-multiplication.

2. MODIFY ESCAPEMENT CONTROLS OF REPEAT OPERATION

It has already been mentioned that in split-multiplication, upon resetting of the multiplier carriage to its adjusted position at the end of the first phase of operation, the carriage is escaped five orders to the left of its normal position—which is the equivalent of adding five "0's" to the multiplier factor. The mechanism for operating the modifying means is shown in FIGS. 15 and 16 and the means for modifying the escapement is shown particularly in FIGS. 10 and 17. It is seen in FIGS. 15 and 16 that a second link 885 is mounted to the left of the repeat setting link 871. The forward end of the link 885 is supported on a pin 886, the link being provided with a slot 887 at its front end which embraces the pin 886. The pin 886 is mounted on the lower end of an arm 888 that is pinned to, or otherwise rigidly secured on, the left end of a shaft 889 (see also FIG. 17). The shaft 889 (as is shown in FIG. 17) is journalled in the left side control plate 45 and the intermediate frame plate 44. A spring 890 (FIGS. 15 and 16), tensioned between the pin 886 and a stud on the forward end of the link, resiliently holds the link and arm 888 in the retracted position shown.

The rear end of the link 885 is resiliently supported by a spring 895 tensioned between a stud 896 and a stud on a connecting link 897, the upper end of which is pivotally connected to the repeat restore bellcrank 941 by any suitable means, such as a pin 898. It is obvious that the spring 895 will resiliently bias the rear end of the link 885 upwardly. The link 897, however, is provided at its lower end with a slot 899 which embraces the pin 896, so that when the link 897 is depressed, the rear end of the link 885 will be lowered. It can be noted at this point that the bellcrank 941 is rocked clockwise in these figures and the link 897 depressed by the shifting of the register carriage to the sixth ordinal position in the second phase of a split operation.

The extreme rear end of the link 885 is provided with a hook, or shoulder, 905 adapted to engage a pin 906 when the rear end of the link 885 is lifted. The pin 906 is carried by an arm 907 that is pivotally mounted on the left side control plate 45 by any suitable means, such as the screw stud 908. The upper end of the arm 907 is slotted, as at 909, which slot embraces the pin 855. Normally the pin 906 engages the edge of the link behind the notch 905 (as shown in FIG. 15). As soon as the cam follower 851 is released and rocks forwardly (counter-clockwise to the position shown in FIG. 16), arm 907 also rocks forwardly (clockwise in these figures) and the pin 906 passes in front of the shoulder 905. Thereupon the spring 895 will lift the rear end of the link and the shoulder 905 will engage the pin 906. Thus, when the cam 850 restores the cam follower arm 851 to the position shown in FIG. 15, the link 885 will be pulled rearwardly and will be held in the rearward position by the latching of link 871, which has already been described.

The shaft 889, as shown in FIGS. 10 and 17, carries an arm 915, the rear end of which underlies a flange 916 on a collar 917. The collar 917 is mounted on a square stud 918 rigidly affixed to the arm 739. A spring 919 encircling the stud 918 and seated between the flange 916 and the head of the stud, resiliently biases the collar downwardly to the position shown in FIG. 10. This collar 917 carries the arm 741 previously described in connection with the repeat mechanism. When the collar 917 is in the lower position shown, the pin 740 carried by arm 741 will be engaged by the forward face of the leftwardly extending arm 415 of the three-armed lever 407. However, the rocking of the shaft 889 (clockwise in FIGS. 15, 16 and also in FIG. 10) lifts the collar 917 so that the pin 740 misses arm 415 but is engaged by the loosely mounted arm 739. The arm 739 carries a bracket 920, the downwardly turned ear 921 of which will engage the forward edge of the leftwardly extending arm 415 of lever 407 after five ordinal increments of movement of arm 407 beyond the latched position of arm 739. It will be recalled that in any repeat operation the arm 739 is latched in an ordinal position according to the value inserted into the multiplier unit before the operation of the repeat key. When the collar 917 is in its lower position, the arms 415 and 739 move together and arm 415 cannot advance beyond the latched position of arm 739. However, when the collar 917 is lifted by the rocking of shaft 889, the arm 407 can escape five ordinal spaces beyond the position of latched arm 739. By this means the multiplier carriage is escaped five orders to the left of its original position at the end of the first phase of the split operation—which is the equivalent of inserting five "0's" into the multiplier factor.

C. *Operation—first phase*

If the split-multiplication control lever 801 has been pulled forward to its operative position, the machine is conditioned for a split-multiplication operation. As already indicated, the positioning of the key in this position pulls the "add" key 270 forward and thereby conditions that mechanism for operation at the end of the first and second phases of the split-multiplication. Such positioning of the conditioning key has also pulled the blocking arm 830 (FIGS. 15 and 16) forward to the position shown in these figures. This block has no effect upon the first phase of the operation. It does condition mechanism for returning the repeat key to its inoperative position beginning in the second phase of operation. What is important in the first phase of operation is that the rocking of the shaft 802 (clockwise in the figures) has allowed link 871 to rise and released the link 840 from pin 970. The multiplicand factor is thereupon set in the main keyboard keys 80 (being limited to the right-hand five orders thereof) and the multiplier factor, again not exceeding five digits, is placed in the multiplier value keys 393, 394. Thereafter, one of the multiply control keys (usually the normal multiply control key) is depressed to initiate the first phase of operation. The lifting of the link 580, resulting from the depression of this key, lifts the link 863 and thereby rocks the latch member 860 clockwise to release pin 855. As indicated above, the subtractive multiply key 640 is normally not used in the first phase of operation, and hence no means for releasing latch 860 from depression of this key is necessary. If it were desirable to initiate the first phase as a subtractive operation, it would be easy to do so by providing means for rocking latch 860 from depression of this key as well.

The rocking of latch 860 releases pin 855 and consequently the cam follower arm 851 snaps forwardly (counter-clockwise in these figures) from the position shown in FIG. 15 to that shown in FIG. 16. Such rocking of the follower arm moves the link 871 forwardly, so that the rear edge of bracket 876 lies in front of pin 755 on the repeat latch lever 750. Immediately upon the start of the machine operation the cam 850 rocks the arm 851 rearwardly (clockwise in these figures), thereby pulling link 871 rearwardly. Such movement of the link 871, of course, rocks lever 750 and sets the repeat mechanism to its effective position. This rocking takes place in the first quarter of the first cycle of operation, and before the automatic carriage shifting and register clearing mechanism can be operated, as the mechanism for controlling these operations is conditioned for operation in the first cycle of operation and begins to operate in the second.

The initial rocking of the follower arm 851, resulting from depression of one of the multiply keys, has also been effective to rock the arm 907 forwardly (clockwise in these figures), so that the pin 906 thereon lies in front of the shoulder 905 on link 885. As the cam restores the follower arm 851, the lever 907 is rocked rearwardly (counter-clockwise in these figures), thereby pulling the link 885 rearwardly and thereby setting the mechanism shown in FIGS. 10 and 17 to modify the repeat controls insofar as they control the escapement of the multiplier carriage at the end of this phase of operation. That is, the translation of link 885 rocks arm 915, thereby lifting the pin 740 away from engagement with the leftwardly extending arm 415 of the escapement lever 407. By this means the multiplier carriage is allowed to escape five orders to the left beyond the initial position, at the end of the first phase of operation.

It will be recalled that the link 871 is latched in its rearward position by the engagement of pin 517 on lever 515 with the shoulder 877 on bracket 878. This holds the link and the follower assembly in the rearward position, so that it is operated once in the first cycle of machine operation and is then latched in an inoperative position until the multiplication operation is completed and the U-lever 515 rocks (clockwise in these figures) to its inoperative position.

D. *Release repeat mechanism—second phase of operation*

In the second phase of the split-multiplication operation the multiplier carriage has been operated to retain the initial multiplier factor and is escaped five orders to the left of its original position. In this phase of the split operation, the multiplicand factor is set in the left-hand side of the keyboard keys 80. Then, when any of the three multiplication control keys is depressed, the second phase of operation is initiated. In this situation it is normally desirable to avoid clearing the right-hand side of the register, so that usually the accumulate multiply key 610 or the subtractive multiply key 640 will be used. The regular program of multiplication operation will be initiated, so that in the simplest form of the invention the carriage 60 will be shifted to the extreme left-hand position shown in FIG. 1 and then returned five orders to initiate the multiplication operation in the sixth order of the counter or the eleventh order of the accumulator register. This shifting is the result of the insertion of the five "0's," i.e., the escapement of the multiplier carriage five additional spaces upon the operation of the repeat multiplication mechanism.

One further operation is necessary in the second phase that was not required by the first, and that is the release of the repeat multiplier mechanism in order that it will be returned to an inoperative position at the end of the second phase of the split operation. Included in this restoration of the repeat mechanism is the restoring of the escapement control mechanism to its normal condition. The mechanism for this purpose will now be described.

A simple means of controlling this operation is by means of a roller 930 (FIGS. 1 and 17) which is carried by an angular arm 929 rigidly mounted on the shaft 457. It will be recalled that this shaft is journalled in the left side control plate 45 and the left side intermediate plate 46. The roller 930 normally engages the forwardly extending edge of the front carriage rail 67 (see also FIG. 2). A notch 931 in the rail is so located as to register with the roller 930 when the carriage 60 is shifted five ordinal steps to the right from its home position shown in FIG. 1. At that time the sixth order of the counter is aligned with the units of the keyboard. The left end of the shaft 457 carries an arm 932 rigidly mounted thereon (FIGS. 15 and 16). A spring 933 strongly biases the arm forwardly (counter-clockwise in these two figures) and consequently resiliently biases the roller 930 against the edge of the front carriage rail 67. When the notch 931 registers with the roller 930, the assembly of the roller 930, its arm 929, shaft 457, and arm 932 rock (counter-clockwise in FIGS. 15 and 16).

A pin 934 affixed to the lower end of the arm 932 is embraced within a diagonal slot 940 formed in the rearwardly extending arm of a bellcrank 941 which is pivotally mounted on the stud 852. The forwardly extending leg of the bellcrank is provided with an arcuate face 942 at its forward lower corner. This arcuate face is adapted to cooperate with the pin 833 carried on the blocking arm 830, the curvature of this face being approximately that caused by rotation of the pin 833 about its pivot 832. When the blocking arm 830 is rocked rearwardly (counter-clockwise from the position shown in these figures) the pin 833 underlies the face 942 and prevents rocking of the bellcrank 941, or the sensing assembly including the roller 930. However, when the machine is conditioned for split operation and the blocking arm is rocked forwardly, as it is in these figures, the pin 833 lies forwardly of the face 942 and consequently the arm 941 can rock. It is believed obvious that the bellcrank 941 will rock (clockwise in these figures) upon the counter-clockwise rocking of the sensing assembly including the arm 932 and the roller 930 due to the camming effect of the pin 934 on the walls of slot 940.

The link 897, which has already been mentioned, is suspended from the front end of the bellcrank 941, as by a pin 898. It is believed apparent that the rocking of the bellcrank (clockwise in these figures) causes depression of the link 897 and consequently the lowering of the rear end of escapement control link 885. Such rocking of the link 885, of course, releases its shoulder 905 from the pin 906, and thereby enables the link 885 to move forwardly and hence restore the mechanism for modifying the carriage escapement in repeat operation. It is apparent that at the start of the second phase of operation, the link 885 was pulled rearwardly as it was at the beginning of the first phase, for latch 860 is operated from the depression of a multiplier control key. However, as the carriage is shifted into the sixth ordinal position, the sensing assembly, including the roller 930 and the arm 932, is enabled to rock, and the link 897 is depressed at this time. At this ordinal position the compression spring 919 (FIG. 10) is effective to push the collar 917 downwardly, as at this position of the multiplier carriage the front edges of arms 737 and 407 are in alignment and the pin 740 can drop over the front edge of the latter. Therefore, insofar as the mechanism for controlling the escapement of the multiplier carriage in repeat operations is concerned, the machine has been returned to normal condition.

It should perhaps be noted that I prefer to provide a link 943 to prevent operation of the bellcrank 941 in all operations except multiplication. The lower end of this link is preferably mounted upon a pin 449 (FIG. 14) which connects the spring-powered lever 439 to lever 459. The upper end of the link 943 is slotted, as at 944 (FIGS. 15 and 16), to embrace the pin 898. By this means the bellcrank 941 is locked against operation so long as the lever 439 is in its inoperative position, i.e., the bellcrank 941 can be rocked only in multiplication operations after the actual multiplication has been initiated.

The actual restoration of the repeat key 690 and its associated mechanism to its inoperative, or nonrepeat, condition is effected by means of a hook link 950 (FIGS. 15 and 16). The rear end of the link is provided with a forwardly facing hook, or shoulder, 951 adapted to engage the pin 934 when the arm 932 is rocked forwardly (counter-clockwise in these figures) and the link 950 is in its forward, or repeat, position. In all operations except actual multiplication the rear end of the link is kept elevated by means of a link 952, the lower end of which is also mounted on pin 449. The upper end of the link 952 is slotted, as at 953, to embrace a pin 954 affixed to the rear end of the link 950. Thus, when the multiplication initiating bellcrank 439 is in the inoperative (clockwise) position shown in these figures, the link 952 lifts the rear end of link 950 away from pin 934. However, when the control bellcrank 439 is enabled to rock to initiate multiplication (counter-clockwise from the force of spring 441), the rear end of link 950 is permitted to drop and the pin-and-slot connection 953, 954 enables the bellcrank 439 to rock to its fully operative position, although the link 950 may not have dropped to its fully operated position. At this time the edge of the link to the rear of the shoulder 951 will be riding upon the pin 934, for the link 950 is pulled forwardly upon the setting of the repeat mechanism in the first cycle of the first phase of operation.

The forward end of link 950 is pivotally mounted on the downwardly extending leg of an angularly shaped slide 960, such as by means of a pin 961. The forward end of the slide 960 is pivotally connected to the pin 753 which connects the repeat setting slide 676 (FIG. 9) with the latching bellcrank 750 (FIGS. 15 and 16). A slot 962 in the slide embraces a pin 963. When the arm 932 is rocked forwardly (counterclockwise in FIGS. 15 and 16) by the registration of roller 930 with notch 931, the pin 934 rocks forwardly of the shoulder 951, whereupon the link 950 will settle downwardly so that the pin is engaged by that shoulder. Then, as the register carriage 60 is shifted from the sixth ordinal position and the sensing assembly, including the roller 931 and the arm 932, is rocked in the reverse direction (clockwise in FIGS. 15 and 16), the link 950 is pulled rearwardly. The amount of such motion will not be sufficient to reset the repeat key to its normal position but it will be sufficient to move it from its detent which holds it in the repeat position. There is some lost motion between the pins 518 on U-lever 515 and the ear 754 on the lower end of the latching rocker 750, so that the repeat key 690 is moved slightly toward its normal position and then held by the interlock of pin 518 and ear 754. There is enough lost motion in the parts to enable the arm 932 to be rocked back to its home position even though the link 950 is not returned sufficiently to completely release the repeat key 690. However, as soon as the second phase of operation is completed and the lever 515 returns to its normal position (which occurs early in the restore cycle for the multiplier mechanism, as this is controlled by the movement of the carriage prior to the restoration of the multiplier segments), the force of spring 677 is enabled to pull the key 690 to its normal, or nonrepeat, position. This restoration takes place in the first half of the restore cycle and prior to the restoration of the multiplier segments. Thus, at the moment that the multiplier segments are restored, the repeat key 690 is in its normal, or nonrepeat, position and the segments can be restored to their "0" position and there latched by the normal restore mechanism. At this point the machine is again ready for another split-multiplication operation.

I claim:

1. In a calculating machine having a multiplication mechanism, an ordinally shiftable register carriage having a normal multiplication position, means for setting a factor into said multiplication mechanism, a multiply key normally operative to shift said carriage to its normal multiplication position and repeat means for automatically resetting a multiplier value in said multiplication mechanism so that it may be used in repetitive operation, a control means, a means controlled by said control means and operative upon resetting of said multiplier value by operation of said repeat means to shift the register carriage a predetermined number of ordinal steps higher than its normal position upon a second operation by said multiple key.

2. In a calculating machine having a multiplier mechanism ordinally shiftable as a unit, manual means for setting a factor into said multiplier mechanism, an escapement mechanism operated by said manual means for controlling ordinal shifting of said multiplier mechanism, and repeat means for automatically resetting a multiplier value in said multiplier mechanism and normally restoring said mechanism to the ordinal position determined by said manual means so that the manual set value may be reused in another multiplication operation, a manually operated control means, means controlled by said control means and operated by said repeat mechanism upon resetting of said multiplier value to operate said escapement mechanism to shift said multiplier mechanism a predetermined number of ordinal steps greater than the position it occupied after operation of said manual means.

3. In a calculating machine having a multiplier mechanism ordinally shiftable as a unit, manual means for setting a factor into said multiplier mechanism, and escapement mechanism operated by said manual means for controlling ordinal shifting of said multiplier mechanism from a normal multiplication position, and a repeat means for automatically resetting a manually set multiplier value into said multiplier mechanism and normally restoring said mechanism to the ordinal position determined by operation of said manual means, the improvement which comprises a selectively operable means for adjusting said repeat mechanism to reset the mechanism to an ordinal position a predetermined number of ordinal steps greater than that determined by operation of said manual means, whereby the resetting of said multiplier value by said repeat mechanism is effective to reset the multiplier value and shift the mechanism the predetermined number of ordinal steps.

4. In a calculating machine having:
   (1) an ordinally arranged multiplier mechanism shiftable as a unit,
   (2) means for inserting values into said mechanism and shifting said mechanism ordinally as values are inserted therein,
   (3) means for setting said mechanism for repeat operation including
      (a) means for restoring the mechanism to its previous value condition, and
      (b) means for restoring said multiplier mechanism to its previous ordinal position, and
   (4) a key for initiating a multiplication operation,
the combination which comprises:
   (5) means controlled by the operation of said key to set said repeat means to its operative position,
   (6) means controlled by the operation of said key for shifting said mechanism a predetermined number of ordinal increments from its previous ordinal position upon the resetting of a multiplier factor therein, and
   (7) means operated by a second depression of said multiplication key for restoring said repeat mechanism to its inoperative position at the completion of the multiplication operation caused by the said second depression of such key.

5. In a calculating machine having:
   (1) an ordinally arranged multiplier mechanism shiftable as a unit,
   (2) means for inserting values into said multiplier mechanism,
   (3) an escapement mechanism for shifting said multiplier mechanism one order as each digital value is inserted therein, (4) means for setting said mechanism for repeat operation including means for restoring the mechanism to its previous value condition and its previous ordinal position, and
(5) a key for initiating a multiplication operation, the combination which comprises:
(6) means controlled by the operation of said key to set said repeat means to its operative position, and
(7) means controlled by the operation of said key for shifting said mechanism a predetermined number of ordinal increments from its previous ordinal position upon the resetting of a multiplier factor therein.

6. In a calculating machine having:
(1) an ordinally arranged register,
(2) means for shifting said register,
(3) an actuating means,
(4) an ordinally arranged multiplier mechanism,
(5) means for inserting digital values into said multiplier mechanism,
(6) means for setting said multiplier mechanism for repeat operation including means for restoring the mechanism to its previous digital value position, and
(7) a means for initiating a multiplication operation normally effective to first operate said shifting means to shift said register to a home position and then control operation of said actuating means under control of said multiplier mechanism,
the combination which comprises:
(8) means controlled by a first operation of said initiating means to set said repeat means to its operative position, and
(9) means controlled by a second operation of said initiating means for operating said shifting means to shift said register a predetermined number of ordinal increments from its home position prior to operation of said actuating means.

7. In a calculating machine having:
(1) an ordinally arranged value indexing mechanism,
(2) an ordinally arranged register,
(3) means for shifting the relative ordinal relationship of said value indexing means and said register,
(4) an "add" key mechanism for automatically clearing said value indexing mechanism at the end of a series of programmed operations,
(5) a multiplier control mechanism containing a plurality of ordinally arranged control members,
(6) value indexing means for said control members including means for ordinally shifting said multiplier mechanism as a value is inserted therein,
(7) a multiplier programming means operated under control of said members to control a multiplication operation,
(8) a multiplier restoring mechanism operable at the end of a multiplication operation to restore the multiplier mechanism to normal position,
(9) a repeat multiplier mechanism operable to:
  (a) disable said restoring mechanism to prevent clearing of values from said members, and
  (b) to return said multiplier programming means to a predetermined adjusted position, and
(10) a drive means,
the combination which comprises:
(11) a split-multiplication control member,
(12) means operated by said control member to set said "add" key mechanism to operative condition,
(13) means conditioned by said control member and operated by said drive means to set said repeat mechanism to operative condition upon initiation of machine operation,
(14) means operated by said conditioning member for adjusting said multiplier mechanism a predetermined number of ordinal spaces from its original position upon operation of said repeat mechanism, and
(15) means operated by the drive means during the next operation of said multiplying mechanism to restore said repeat mechanism to an inoperative condition.

8. In a calculating machine having:
(1) an ordinally arranged manually operated value indexing mechanism,
(2) an ordinally arranged register having a home position for normally initiating a multiplication operation,
(3) means for shifting the relative ordinal relationship of said value indexing means and said register,
(4) an "add" key mechanism for automatically clearing said value indexing mechanism at the end of a multiplication operation,
(5) a multiplier control mechanism containing:
  (a) a plurality of ordinally arranged control members,
  (b) value indexing means for setting said members to positions representing selected digital values,
  (c) feed means for incrementally returning an operative member to its "0" position, and
  (d) a multiplier programming means operated by the return of an operative member to its "0" position for operating said shifting means to incrementally shift said register from its home position,
(6) a multiply key normally operative to control operation of said shifting means to shift said register to its home position and then initiate a multiplication operation under control of said multiplier control mechanism, and
(7) a repeat multiplier mechanism operable to automatically reset said members to the value positions determined by the manual operation of said indexing means,
the combination which comprises:
(8) a split-multiplication control member,
(9) means controlled by the operation of said control member to set said "add" key mechanism to operative condition,
(10) means controlled by the operation of said control member and said key to set said repeat mechanism to operative position,
(11) means controlled by the operation of said control member for adjusting said shifting means to shift the register carriage a predetermined number of ordinal spaces from its normal home position upon a second operation of said key, and
(12) means operated by the subsequent operation of said key to restore said repeat mechanism to an inoperative position.

9. In a calculating machine having:
(1) an ordinally arranged value indexing mechanism,
(2) an ordinally arranged register,
(3) means for shifting the relative ordinal relationship of said value indexing means and said register,
(4) an "add" key mechanism for automatically clearing said value indexing mechanism at the end of a series of programmed operations,
(5) a multiplier storage mechanism containing a plurality of ordinally arranged control members,
(6) an escapement mechanism for shifting said multiplier storage mechanism,
(7) value indexing means for said control members including means for operating said escapement mechanism to shift said multiplier storage mechanism as a value is inserted therein,
(8) a multiplier programming means operated under control of said members to control a multiplication operation,
(9) a multiplication initiating key,

(10) a multiplier restoring mechanism operable at the end of a multiplication operation to restore the multiplier mechanism to a "0" condition,
(11) a repeat multiplier mechanism operable to:
   (a) disable said restoring mechanism to prevent clearing of values from said members, and
   (b) to return multiplier programming means to the same ordinal position it occupied after operation of said value indexing means, and
(12) a drive means,
the combination which comprises:
(13) a split-multiplication control member,
(14) means operated by said control member to set said "add" key mechanism to operative condition,
(15) means conditioned by said control member and operated by said drive means upon a first operation of said key to set said repeat mechanism to operative position,
(16) means conditioned for operation by said control member and operated by said drive means for operating said escapement mechanism to shift said multiplier mechanism a predetermined number of ordinal spaces from its original position upon operation of said repeat mechanism, and
(17) means conditioned by the subsequent operation of said key and operated by said drive means during the second operation of the multiplying mechanism for restoring said repeat mechanism to an inoperative position.

10. In a calculating machine having a multiplication mechanism, an ordinally shiftable register carriage having a normal multiplication position, a multiply key normally operative to shift said carriage to its normal multiply position, means for setting a factor into said multiplication mechanism, and repeat means for retaining a multiplier value in said multiplication mechanism so that it may be used in repetitive operations, the combination which comprises a manipulative member and a means operated by said member for controlling said multiplication mechanism upon operation of said key to initiate alternate operations in the normal position and the other operations at a position a predetermined number of ordinal steps from its normal position.

11. In a calculating machine having a multiplication mechanism, a shiftable register carriage, means for ordinally shifting said carriage, means for setting a factor into said multiplication mechanism, a multiply key normally operative to operate said shifting means to shift said carriage to a normal multiply position, and means for releasably latching a multiplier value in said multiplication mechanism so that it may be used in repetitive operations, a selectively operable means, means controlled by said selectively operable means and operated by said key for operating said shifting means to alternately shift the carriage to the normal carriage position and to a position a predetermined number of ordinal steps from its normal position.

12. In a calculating machine having:
(1) a multiplier mechanism,
(2) manual means for setting a factor into said multiplier mechanism,
(3) an ordinally shiftable register,
(4) shifting means for normally shifting said register to a normal multiplication position upon initiation of a multiplication operation,
(5) and a means for releasably latching a multiplier value set into said multiplier mechanism, whereby such a value may be used repeatedly, and
(6) a key for initiating a multiplication operation,
the improvement which comprises:
(7) a means for modifying operation of said shifting means to shift the register to an ordinal position a predetermined number of ordinal steps from the normal position, and
(8) means operated by said key for alternately operating and not operating said modifying means.

13. In a calculating machine having:
(1) an ordinally arranged register,
(2) means for shifting said register,
(3) an actuating means,
(4) an ordinally arranged multiplier mechanism,
(5) means for inserting digital values into said multiplier mechanism,
(6) means for releasably latching a multiplier value in said multiplier mechanism, and
(7) a means for initiating a multiplication operation normally effective to first operate said shifting means to shift said register to a home position and then control operation of said actuating means under control of said multiplier mechanism,
the combination which comprises:
(8) means controlled by one operation of said initiating means to operate said shifting means to shift said register to its home position and then operate said actuating means, and
(9) means controlled by a second operation of said initiating means for operating said shifting means to shift said register a predetermined number of ordinal increments from its home position prior to operation of said actuating means.

14. In a calculating machine having:
(1) an ordinally arranged multiplier mechanism shiftable as a unit,
(2) means for inserting values into said multiplier mechanism,
(3) an escapement mechanism for shifting said multiplier mechanism one order as each digital value is inserted therein, and
(4) means for setting said mechanism for repeat operation including means for restoring the mechanism to its previous value condition and its previous ordinal position,
a means for controlling operation of said multiplier mechanism to initiate alternate operations in the normal position and in a position a predetermined number of ordinal spaces from its normal position which comprises the combination of:
(5) a manipulative member,
(6) means conditioned by the operation of said member in alternate operations to set said repeat means to its operative position,
(7) means for modifying operation of said setting means to restore said multiplier mechanism to a position a predetermined number of ordinal spaces from its normal position, and
(8) means controlled by the operation of said member in the other operations for operating said modifying means.

References Cited by the Examiner

UNITED STATES PATENTS

| | | | |
|---|---|---|---|
| 2,613,872 | 10/52 | Brown | 235—6 |
| 2,758,789 | 8/56 | Ellerbeck | 235—63.21 |
| 2,824,695 | 2/58 | Plunkett | 235—63.231 |
| 2,868,453 | 1/59 | Ellerbeck | 235—63.231 |
| 3,017,081 | 1/62 | Scozzafava | 235—60 |

OTHER REFERENCES

A.P.C. Application of Hoszler, Ser. No. 353,408, published May 25, 1943.

LEO SMILOW, *Primary Examiner.*

A. BERLIN, *Examiner.*

UNITED STATES PATENT OFFICE
CERTIFICATE OF CORRECTION

Patent No. 3,207,430                          September 21, 1965

Dunstan S. Gross

It is hereby certified that error appears in the above numbered patent requiring correction and that the said Letters Patent should read as corrected below.

Column 3, lines 1 and 2, for "multiplicant" read -- multiplicand --; column 4, line 7, for "mention" read -- mentioned --; column 8, line 6, for "Multipliction" read -- Multiplication --; column 10, line 4, for "ordinarily" read -- ordinally --; line 8, for "clutch" read -- clutches --; column 14, line 31, for "ordinarily" read -- ordinally --; column 15, line 21, for "242" read -- 424 --; column 17, line 26, for "operaiton" read -- operation --; column 22, line 1, for "substractive" read -- subtractive --; column 23, line 55, for "positive" read -- position --; column 25, line 75, for "752" read -- 753 --; column 31, line 14, for "an" read -- and --; line 45, for "resiilently" read -- resiliently --; column 33, line 6, for "postion" read -- position --; line 25, for "escapment" read -- escapement --; column 35, line 46, for "pins" read -- pin --; column 36, line 1, for "operation" read -- operations --; line 16, for "manual", second occurrence, read -- manually --; column 39, line 7, after "return" insert -- said --.

Signed and sealed this 7th day of June 1966.

(SEAL)
Attest:

ERNEST W. SWIDER                          EDWARD J. BRENNER
Attesting Officer                       Commissioner of Patents